(12) United States Patent
Fuke et al.

(10) Patent No.: US 11,964,439 B2
(45) Date of Patent: Apr. 23, 2024

(54) REINFORCEMENT STRUCTURE AND PRODUCING METHOD OF REINFORCEMENT STRUCTURE

(71) Applicant: NITTO DENKO CORPORATION, Osaka (JP)

(72) Inventors: Kazuhiro Fuke, Osaka (JP); Masatsugu Koso, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 480 days.

(21) Appl. No.: 16/765,644

(22) PCT Filed: Oct. 31, 2018

(86) PCT No.: PCT/JP2018/040562
§ 371 (c)(1),
(2) Date: May 20, 2020

(87) PCT Pub. No.: WO2019/102810
PCT Pub. Date: May 31, 2019

(65) Prior Publication Data
US 2020/0298501 A1 Sep. 24, 2020

(30) Foreign Application Priority Data
Nov. 27, 2017 (JP) .................. 2017-226984

(51) Int. Cl.
*B29C 65/00* (2006.01)
*B29C 65/50* (2006.01)
(Continued)

(52) U.S. Cl.
CPC .............. *B29C 65/50* (2013.01); *B29C 66/13* (2013.01); *B29C 66/742* (2013.01); *B32B 7/12* (2013.01);
(Continued)

(58) Field of Classification Search
CPC .......... B29C 33/38; B29C 45/14; B29C 65/48
See application file for complete search history.

(56) References Cited

U.S. PATENT DOCUMENTS 5,043,127 A * 8/1991 Brambach ................. B32B 5/28
264/258
8,746,618 B2 * 6/2014 Brook ..................... B64C 1/064
244/119

(Continued)

FOREIGN PATENT DOCUMENTS

| CA | 2046354 A | 1/1992 |
| CN | 102712172 A | 10/2012 |

(Continued)

OTHER PUBLICATIONS

Office Action, which was issued by the European Patent Office dated Apr. 5, 2022, in connection with European Patent Application No. 18880103.9.

(Continued)

*Primary Examiner* — Philip C Tucker
*Assistant Examiner* — Nickolas R Harm
(74) *Attorney, Agent, or Firm* — Edwards Neils LLC; Jean C. Edwards, Esq.

(57) ABSTRACT

A reinforcement structure includes an adherend, such as a metal plate, and a reinforcement sheet adhering thereto. The reinforcement sheet includes a front layer containing a plurality of fibers, a core material layer, and an adhesive layer. The reinforcement structure is capable of intensively reinforcing a first corner portion of the adherend and obtaining an improvement in strength.

10 Claims, 7 Drawing Sheets

(51) Int. Cl.
  *B32B 7/12* (2006.01)
  *B32B 17/10* (2006.01)
  *B29C 33/38* (2006.01)
  *B29C 45/48* (2006.01)
  *B29C 65/48* (2006.01)

(52) U.S. Cl.
  CPC ........ *B32B 17/10816* (2013.01); *B29C 33/38* (2013.01); *B29C 45/48* (2013.01); *B29C 65/48* (2013.01)

(56) References Cited

U.S. PATENT DOCUMENTS

| | | | |
|---|---|---|---|
| 8,771,575 B2* | 7/2014 | Dequine | B29D 99/0003 264/258 |
| 2004/0113461 A1* | 6/2004 | Shimizu | C21D 1/673 296/193.06 |
| 2010/0129584 A1 | 5/2010 | de Groot | |
| 2011/0139932 A1* | 6/2011 | Matheson | B29D 99/0014 156/182 |
| 2012/0160158 A1* | 6/2012 | Sudo | C30B 15/10 65/17.3 |
| 2012/0301668 A1 | 11/2012 | Numano et al. | |
| 2013/0106138 A1 | 5/2013 | Brockhoff et al. | |
| 2014/0030478 A1* | 1/2014 | Wittenberg | B32B 1/04 156/196 |
| 2014/0147693 A1 | 5/2014 | Yasuyama et al. | |
| 2014/0178631 A1 | 6/2014 | Taniguchi et al. | |
| 2014/0186588 A1* | 7/2014 | Victorazzo | B29C 70/28 156/196 |
| 2015/0165746 A1 | 6/2015 | Prebil et al. | |
| 2015/0191623 A1* | 7/2015 | Kaneiwa | D01F 8/16 524/391 |
| 2015/0291218 A1* | 10/2015 | Yoshida | B62D 25/04 296/187.12 |
| 2016/0039470 A1 | 2/2016 | Sakuragi | |
| 2016/0361893 A1 | 12/2016 | Hitomi et al. | |
| 2017/0001407 A1 | 1/2017 | Yamashita et al. | |
| 2017/0030079 A1 | 2/2017 | Ishikawa | |
| 2017/0072656 A1 | 3/2017 | Dodworth | |
| 2017/0106964 A1* | 4/2017 | Ludin | B29C 70/34 |
| 2017/0291387 A1 | 10/2017 | Yamashita et al. | |
| 2019/0118492 A1* | 4/2019 | Glynn | B64C 3/182 |

FOREIGN PATENT DOCUMENTS

| | | |
|---|---|---|
| CN | 103085293 A | 5/2013 |
| CN | 104708890 A | 6/2015 |
| CN | 106103060 A | 11/2016 |
| CN | 106132696 A | 11/2016 |
| CN | 106414066 A | 2/2017 |
| JP | H04-226749 A | 8/1992 |
| JP | 2008-168489 A | 7/2008 |
| JP | 2010-058394 A | 3/2010 |
| JP | 2010-083286 A | 4/2010 |
| JP | 2010-527813 A | 8/2010 |
| JP | 2014-087848 A | 5/2014 |
| JP | 2015-048042 A | 3/2015 |
| JP | 2015-085678 A | 5/2015 |
| JP | 2016-037050 A | 3/2016 |
| WO | 2013/031860 A1 | 3/2013 |
| WO | 2015/159863 A1 | 10/2015 |
| WO | 2016/129360 A1 | 8/2016 |
| WO | 2016/164535 A1 | 10/2016 |

OTHER PUBLICATIONS

International Search Report Issued in PCT/JP2018/040562 dated Jan. 15, 2019.
Written Opinion Issued in PCT/JP2018/040562 dated Jan. 15, 2019.
Office Action, issued by the State Intellectual Property Office dated Jan. 25, 2022, in connection with Chinese Patent Application No. 201880074577.3.
Yang Wenbin, Design Criteria and Examples of Mechanical Structure, pp. 145-146, Machinery Industry Press.
Extended European Search Report, issued by the European Patent Office dated Jun. 28, 2021, in connection with European Patent Application No. 18880103.9.
International Preliminary Report on Patentability issued by WIPO dated Jun. 2, 2020, in connection with International Patent Application No. PCT/JP2018/040562.
Office Action, which was issued by the State Intellectual Property Office dated Aug. 31, 2022, in connection with Chinese Patent Application No. 201880074577.3.
Office Action, which was issued by the State Intellectual Property Office dated Feb. 21, 2023, in connection with Chinese Patent Application No. 201880074577.3.

* cited by examiner

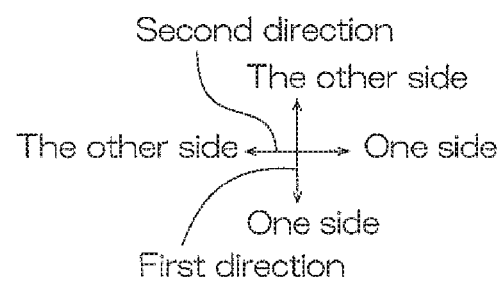
FIG. 2A
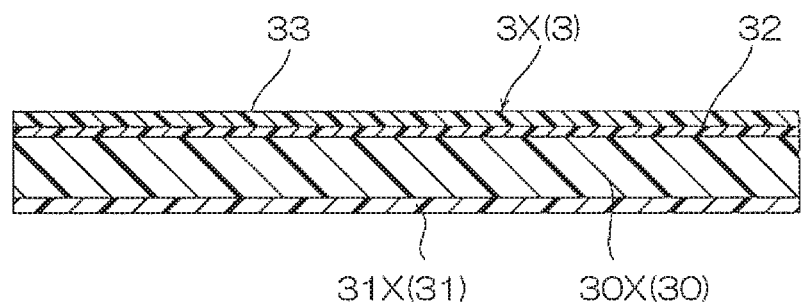
FIG. 2B
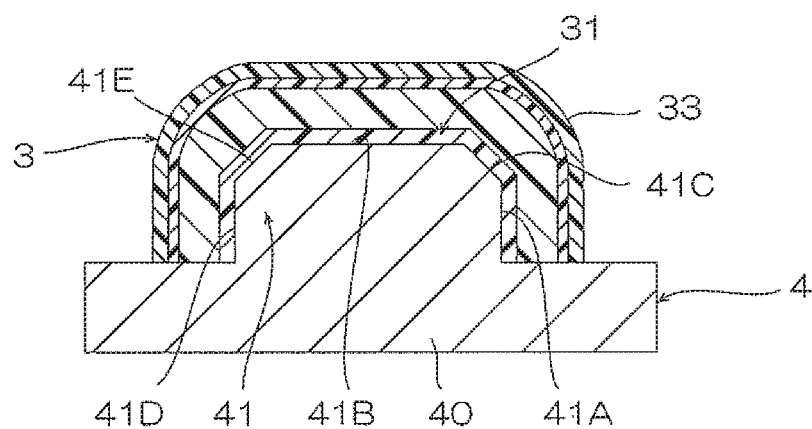
FIG. 2C
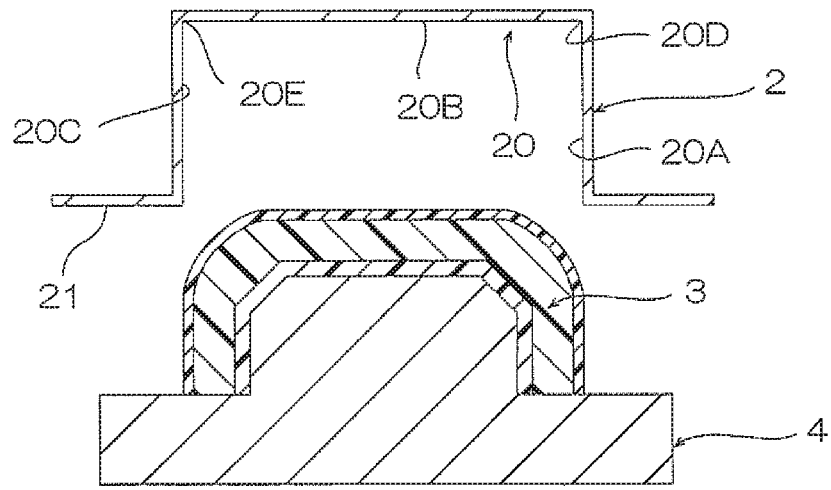

REINFORCEMENT STRUCTURE AND PRODUCING METHOD OF REINFORCEMENT STRUCTURE

CROSS-REFERENCE TO RELATED APPLICATIONS

The present application is a 35 U.S.C. 371 National Stage Entry of PCT/JP2018/040562, filed on Oct. 31, 2018, which claims priority from Japanese Patent Application No. 2017-226984, filed on Nov. 27, 2017, the contents of all of which are herein incorporated by reference in their entirety.

TECHNICAL FIELD

The present invention relates to a reinforcement structure and a method for producing a reinforcement structure.

BACKGROUND ART

It has been conventionally known that an adherend such as metal plate used for various industrial products is reinforced by a reinforcement sheet.

As such a reinforcement sheet, for example, a steel plate reinforcement sheet including glass cloth and a thermosetting resin layer that is laminated on the glass cloth has been proposed (ref: for example, Patent Document 1).

In the steel plate reinforcement sheet, after the thermosetting resin layer is attached to a surface of the adherend along it, and the glass cloth is positioned at a fixed interval (with the same width) to the surface of the adherend, the thermosetting resin layer is cured by heating, so that the adherend is reinforced.

CITATION LIST

Patent Document

Patent Document 1: Japanese Unexamined Patent Publication No. 2010-58394

SUMMARY OF THE INVENTION

Problem to be Solved by the Invention

The adherend has various shapes in accordance with industrial products, and may have, for example, a first surface and a second surface extending in a different direction and a corner portion that connects the first surface to the second surface. In this case, when an external force is applied to the adherend, a stress is concentrated on the corner portion. Then, intensive reinforcement of the corner portion of the adherend is considered.

In the steel plate reinforcement sheet described in Patent Document 1, however, the glass cloth is positioned at a fixed interval (with the same width) to the surface of the adherend in a state of being attached to the adherend, so that the intensive reinforcement of the corner portion cannot be carried out, so that there is a limit in achieving improvement of the strength of the adherend.

The present invention provides a reinforcement structure in which a reinforcement sheet is capable of intensively reinforcing a first corner portion of an adherend, and improvement of the strength is capable of being achieved, and a method for producing a reinforcement structure.

Means for Solving the Problem

The present invention [1] includes a reinforcement structure including an adherend and a reinforcement sheet adhering to the adherend and reinforcing the adherend, wherein the adherend includes a first surface extending in a first direction, a second surface extending in a second direction crossing the first direction, and a first corner portion connecting the first surface to the second surface; the reinforcement sheet includes a front layer containing a plurality of fibers and positioned at spaced intervals to the first surface, the second surface, and the first corner portion and a core material layer containing a resin and disposed between the front layer and the adherend; the front layer includes a first front layer portion positioned at spaced intervals to the first surface in the second direction and extending in the first direction, a second front layer portion positioned at spaced intervals to the second surface in the first direction and extending in the second direction, and a third front layer portion positioned at spaced intervals to the first corner portion in a third direction crossing both directions of the first direction and the second direction and connecting the first front layer portion to the second front layer portion; and a gap between the first surface and the third front layer portion in the second direction gradually increases as it gets closer to the first corner portion in the first direction with respect to a gap between the first surface and the first front layer portion in the second direction, and a gap between the second surface and the third front layer portion in the first direction gradually increases as it gets closer to the first corner portion in the second direction with respect to a gap between the second surface and the second front layer portion in the first direction.

According to the structure, the third front layer portion of the front layer is positioned at spaced intervals to the first corner portion in the third direction; the gap between the first surface and the third front layer portion in the second direction gradually increases as it gets closer to the first corner portion in the first direction with respect to the gap between the first surface and the first front layer portion in the second direction; and the gap between the second surface and the third front layer portion in the first direction gradually increases as it gets closer to the first corner portion in the second direction with respect to the gap between the second surface and the second front layer portion in the first direction.

Thus, compared to a case where a gap between the surface of the adherend and the third front layer portion is fixed (the same width), the reinforcement sheet can intensively reinforce the first corner portion of the adherend, and accordingly, improvement of the strength of the reinforcement structure can be achieved.

The present invention [2] includes the reinforcement structure described in the above-described [1], wherein the core material layer includes a first portion along the first surface, a second portion along the second surface, and a third portion along the first corner portion; and a thickness of the third portion along the second direction is thicker than a thickness of the first portion along the second direction and a thickness of the third portion along the first direction is thicker than a thickness of the second portion along the first direction.

According to the structure, the third portion of the core material layer is along the first corner portion, the thickness of the third portion along the second direction is thicker than that of the first portion along the second direction, and the thickness of the third portion along the first direction is thicker than that of the second portion along the first direction.

That is, the third portion that is positioned near the first corner portion is thicker than both portions of the first portion along the first surface and the second portion along the second surface.

Thus, the reinforcement sheet can more intensively reinforce the first corner portion of the adherend, and accordingly, the improvement of the strength of the reinforcement structure can be surely achieved.

The present invention [3] includes the reinforcement structure described in the above-described [2], wherein the first portion, the second portion, and the third portion are integrated.

According to the structure, the first portion, the second portion, and the third portion are integrated, so that compared to a case where the first portion, the second portion, and the third portions are separate pieces, a reduction of the number of components can be achieved. Also, the improvement of relative position accuracy of the first portion, the second portion, and the third portion can be achieved, and the reinforcement sheet can more stably intensively reinforce the first corner portion.

The present invention [4] includes the reinforcement structure described in the above-described [2] or [3], wherein the adherend further includes a third surface facing the first surface at spaced intervals thereto in the second direction and a second corner portion connecting the third surface to the second surface; the core material layer further includes a fourth portion along the third surface and a fifth portion along the second corner portion; and a thickness of the fifth portion along the second direction is thicker than a thickness of the fourth portion along the second direction and a thickness of the fifth portion along the first direction is thicker than a thickness of the second portion along the first direction.

According to the structure, the fifth portion of the core material layer is along the second corner portion, the thickness of the fifth portion along the second direction is thicker than that of the fourth portion along the second direction, and the thickness of the fifth portion along the first direction is thicker than that of the second portion along the first direction.

That is, the fifth portion that is positioned near the second corner portion is thicker than both portions of the fourth portion along the third surface and the second portion along the second surface.

Thus, even when the adherend has the first corner portion and the second corner portion, the reinforcement sheet can intensively reinforce both of the first corner portion and the second corner portion, and accordingly, the improvement of the strength of the reinforcement structure can be furthermore surely achieved.

The present invention [5] includes the reinforcement structure described in any one of the above-described [1] to [4] further including an adhesive layer disposed between the core material layer and the adherend.

According to the structure, the adhesive layer is disposed between the core material layer and the adherend, so that the core material layer can surely adhere to the adherend. Thus, the reinforcement sheet can stably reinforce the adherend.

The present invention [6] includes the reinforcement structure described in any one of the above-described [1] to [4], wherein the core material layer is in direct contact with each of the first surface, the second surface, and the first corner portion.

According to the structure, the core material layer is in direct contact with each of the first surface, the second surface, and the first corner portion, so that compared to a structure including the adhesive layer, a reduction of the number of components can be achieved, and the first portion, the second portion, and the third portion can be disposed so as to be surely along the first surface, the second surface, and the first corner portion.

The present invention [7] includes a method for producing a reinforcement structure including the steps of preparing a reinforcement sheet including a core material layer containing a resin and a front layer disposed at one side in a thickness direction of the core material layer and containing a plurality of fibers; preparing an adherend including a first surface extending in a first direction, a second surface extending in a second direction crossing the first direction, and a first corner portion connecting the first surface to the second surface; and attaching the reinforcement sheet to the adherend so as to position the core material layer between the adherend and the front layer and position the front layer at spaced intervals to the first surface, the second surface, and the first corner portion, wherein in the step of attaching the reinforcement sheet to the adherend, a first front layer portion in the front layer is disposed so as to be positioned at spaced intervals to the first surface in the second direction and extend in the first direction; a second front layer portion in the front layer is disposed so as to be positioned at spaced intervals to the second surface in the first direction and extend in the second direction; a third front layer portion in the front layer is disposed at spaced intervals to the first corner portion in a third direction crossing both directions of the first direction and the second direction; and the third front layer portion is disposed so that a gap between the first surface and the third front layer portion in the second direction gradually increases as it gets closer to the first corner portion in the first direction with respect to a gap between the first surface and the first front layer portion in the second direction, and a gap between the second surface and the third front layer portion in the first direction gradually increases as it gets closer to the first corner portion in the second direction with respect to a gap between the second surface and the second front layer portion in the first direction.

According to the method, in the step of attaching the reinforcement sheet to the adherend, the third front layer portion is disposed so that the gap between the first surface and the third front layer portion in the second direction gradually increases as it gets closer to the first corner portion in the first direction with respect to the gap between the first surface and the first front layer portion in the second direction, and the gap between the second surface and the third front layer portion in the first direction gradually increases as it gets closer to the first corner portion in the second direction with respect to the gap between the second surface and the second front layer portion in the first direction.

That is, in the step of attaching the reinforcement sheet to the adherend, the third front layer portion in the front layer can be disposed as described above, so that the reinforcement structure having the improved strength can be smoothly produced.

The present invention [8] includes the method for producing a reinforcement structure described in the above-described [7], wherein in the step of attaching the reinforcement sheet to the adherend, the core material layer flows so that in the core material layer, a thickness along the second direction of a third portion along the first corner portion is thicker than a thickness along the second direction of a first portion along the first surface, and a thickness of the third portion along the first direction is thicker than a thickness along the first direction of a second portion along the second surface.

According to the method, in the step of attaching the reinforcement sheet to the adherend, the core material layer containing the resin flows, so that the thickness along the second direction of the third portion along the first corner portion is thicker than the thickness along the second direction of the first portion along the first surface, and the thickness of the third portion along the first direction is thicker than the thickness along the first direction of the second portion along the second surface.

Thus, the third portion of the core material layer can be smoothly formed so as to have the above-described thickness by an easy method.

The present invention [9] includes the method for producing a reinforcement structure described in the above-described [7] or [8], wherein in the step of attaching the reinforcement sheet to the adherend, the reinforcement sheet is pressed toward the adherend by a mold having a shape corresponding to the adherend, and the mold includes a first mold surface extending in the first direction corresponding to the first surface, a second mold surface extending in the second direction corresponding to the second surface, and a third mold surface connecting the first mold surface to the second mold surface and extending in a direction crossing the third direction.

According to the method, the third mold surface of the mold connects the first mold surface to the second mold surface, and extends in the direction crossing the third direction.

Thus, when the reinforcement sheet is pressed toward the adherend by the mold, space for disposing the third front layer portion of the core material layer can be ensured between the first corner portion and the third mold surface. As a result, in the step of attaching the reinforcement sheet to the adherend, the third front layer portion can be smoothly disposed as described above.

Effect of the Invention

In the reinforcement structure of the present invention, a reinforcement sheet can intensively reinforce a first corner portion of an adherend, and improvement of the strength can be achieved.

In the method for producing a reinforcement structure of the present invention, the reinforcement structure having the improved strength can be smoothly produced.

BRIEF DESCRIPTION OF THE DRAWINGS

FIG. 2A shows an explanatory view for illustrating a one embodiment of a method for producing a reinforcement structure of the present invention, and shows a step of preparing a reinforcement sheet.

FIG. 2B, subsequent to FIG. 2A, shows a step of preliminarily shape the reinforcement sheet.

FIG. 2C, subsequent to FIG. 2B, shows a step of preparing a metal plate.

DESCRIPTION OF EMBODIMENTS

First Embodiment

1. Schematic Configuration of Reinforcement Structure

A reinforcement structure 1 that is a first embodiment of a reinforcement structure of the present invention is described with reference to FIG. 1.

Figure 1:
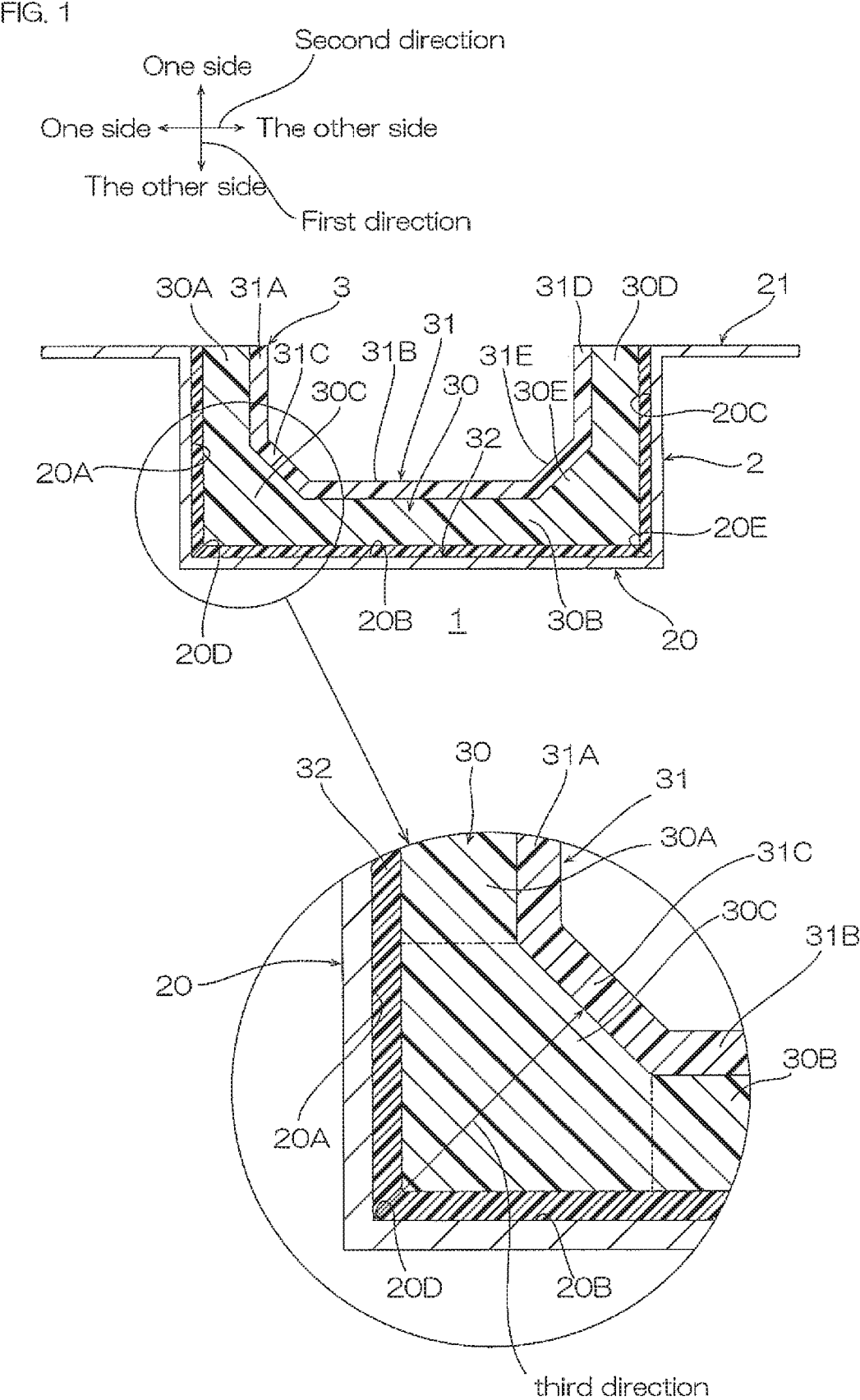
FIG. 1 shows a cross-sectional view of a first embodiment of a reinforcement structure of the present invention.

As shown in FIG. 1, the reinforcement structure 1 includes a metal plate 2 as one example of an adherend and a reinforcement sheet 3, and is configured from the metal plate 2 that is reinforced by the reinforcement sheet 3.

In FIG. 1, the up-down direction on the plane of the sheet is referred to as a first direction, the upper side on the plane of the sheet is referred to as one side in the first direction, and the lower side on the plane of the sheet is referred to as the other side in the first direction. In FIG. 1, the right-left direction on the plane of the sheet is referred to as a second direction perpendicular to the first direction, the left side on the plane of the sheet is referred to as one side in the second direction, and the right side on the plane of the sheet is referred to as the other side in the second direction.

The metal plate 2 has a hat shape when viewed from the cross-sectional view when being cut in the first direction and the second direction, and integrally includes a recessed portion 20 and a flange portion 21.

The recessed portion 20 has a recessed shape having an opening toward one side in the first direction as a cross-sectional shape when being cut in the first direction and the second direction. The inner surface of the recessed portion 20 has a first surface 20A, a second surface 20B, a third surface 20C, a first corner portion 20D, and a second corner portion 20E.

The first surface 20A is the inner-side surface of the recessed portion 20, and is positioned at one end portion in the second direction at the inner surface of the recessed portion 20. The first surface 20A extends in the first direction.

The second surface 20B is the bottom surface of the recessed portion 20, and is positioned at the other end portion in the first direction at the inner surface of the recessed portion 20. The second surface 20B extends in the second direction.

The third surface 20C is the inner-side surface of the recessed portion 20, and is positioned at the other end portion in the second direction at the inner surface of the recessed portion 20. The third surface 20C faces the first surface 20A at spaced intervals thereto in the second direction. The third surface 20C extends in the first direction.

The first corner portion 20D connects the first surface 20A to the second surface 20B. To be more specific, the first corner portion 20D is a continuous portion from the other end portion in the first direction of the first surface 20A to one end portion in the second direction of the second surface 20B. In the first corner portion 20D, the other end portion in the first direction of the first surface 20A and one end portion in the second direction of the second surface 20B form an angle of about 90°.

The second corner portion 20E connects the second surface 20B to the third surface 20C. To be more specific, the second corner portion 20E is a continuous portion from the other end portion in the second direction of the second surface 20B to the other end portion in the first direction of the third surface 20C. In the second corner portion 20E, the other end portion in the second direction of the second surface 20B and the other end portion in the first direction of the third surface 20C form an angle of about 90°. The second corner portion 20E is positioned al spaced intervals to the first corner portion 20D at the other side in the second direction.

The flange portion 21 is continuous from one end portion in the first direction at the outer surface of the recessed portion 20, and extends outwardly in the second direction.

The metal plate 2 is a metal plate used for various industrial products, and is not particularly limited. Examples of the metal plate 2 include metal plates (for example, pillar (A pillar, B pillar, C pillar), side sill, roof rail, roof, fender, hood, trunk, quarter panel, door, or the like for automobiles) used for transportation machines and metal plates used for household electric appliances. Preferably, a metal plate used for transportation machines is used.

The reinforcement sheet 3 adheres to the metal plate 2 and reinforces the metal plate 2. The reinforcement sheet 3 is disposed at the inside of the recessed portion 20 in the metal plate 2, and adheres along the inner surface of the recessed portion 20. The reinforcement sheet 3 includes a core material layer 30, a front layer 31, and an adhesive layer 32, and preferably consists of the core material layer 30, the front layer 31, and the adhesive layer 31

The core material layer 30 is disposed between the inner surface of the recessed portion 20 and the front layer 31, and is along the first surface 20A, the first corner portion 20D, the second surface 20B, the second corner portion 20E, and the third surface 20C. The core material layer 30 has a U-shape having an opening toward one side in the first direction as a cross-sectional shape when being cut in the first direction and the second direction. The core material layer 30 contains at least a resin, and preferably contains a filler. In the following, the resin contained in the core material layer 30 is referred to as a core material resin.

Examples of the core material resin include polyolefin resin, polyamide resin, polyacetal resin, polycarbonate resin, polyphenylene ether resin, polybutylene terephthalate resin, polysulfide resin, polyphenylene sulfide resin, polyether ether ketone resin, polyimide resin, polyether imide resin, liquid crystal polymer, fluorine resin, epoxy resin, phenol resin, melamine resin, urea resin, unsaturated polyester, thermosetting polyimide resin, polyurethane resin, alkyd resin, and benzoxazine resin. Preferably, an epoxy resin is used.

To be specific, examples of the epoxy resin include unmodified epoxy resin, rubber-modified epoxy resin, urethane-modified epoxy resin, and silicone-modified epoxy resin. These core material resins can be used alone or in combination of two or more.

Of these core material resins, preferably, an unmodified epoxy resin and a rubber-modified epoxy resin are used.

The unmodified epoxy resin is an epoxy resin that is not modified by a modifier (for example, a rubber component (described later) or the like) having a functional group that reacts with an epoxy group. Examples of the unmodified epoxy resin include bisphenol epoxy resin (for example, bisphenol A epoxy resin, bisphenol F epoxy resin, bisphenol S epoxy resin, hydrogenated bisphenol A epoxy resin, or the like), novolak epoxy resin (for example, phenol novolak epoxy resin, cresol novolak epoxy resin, or the like), aromatic epoxy resin (for example, biphenyl epoxy resin, naphthalene epoxy resin, or the like), nitrogen-containing cyclic epoxy resin (for example, triglycidyl isocyanurate, hydantoin epoxy resin, or the like), alicyclic epoxy resin (for example, dicyclo ring-type epoxy resin or the like), glycidyl ether epoxy resin, and aliphatic epoxy resin. These unmodified epoxy resins can be used alone or in combination of two or more.

Of these unmodified epoxy resins, preferably, a bisphenol epoxy resin is used, more preferably, a bisphenol A epoxy resin is used.

The rubber-modified epoxy resin is an epoxy resin containing a rubber component, and is a reaction product of the epoxy resin with the rubber component.

As the epoxy resin used for the rubber-modified epoxy resin, for example, the above-described unmodified epoxy resin is used, preferably, a bisphenol epoxy resin is used, more preferably, a bisphenol A epoxy resin and a bisphenol F epoxy resin are used.

The rubber component has the functional group that reacts with the epoxy group. Examples of the rubber component include terminated carboxyl group butadiene-acrylonitrile copolymer (CTBN), butadiene rubber, acrylic rubber, and styrene-butadiene elastomer. These rubber components can be used alone or in combination of two or more.

Of these rubber components, preferably, a terminated carboxyl group butadiene-acrylonitrile copolymer (CTBN) is used. That is, as the rubber-modified epoxy resin, preferably, a CTBN-modified epoxy resin that is modified with a CTBN is used.

To prepare the rubber-modified epoxy resin, for example, the above-described unmodified epoxy resin is mixed with the above-described rubber component, and a catalyst is added thereto as needed to react (be modified) at, for example, 100 to 180° C. In this manner, the functional group and the epoxy group of the rubber component react, thereby preparing the rubber-modified epoxy resin.

The unmodified epoxy resin and the rubber-modified epoxy resin are preferably used in combination. More preferably, the core material resin consists of the unmodified epoxy resin and the rubber-modified epoxy resin. When the unmodified epoxy resin and the rubber-modified epoxy resin are used in combination, improvement of compatibility and adhesive properties of the core material resin can be achieved compared to a case where the unmodified epoxy resin is mixed with a synthetic rubber (for example, polybutene rubber or the like).

When the unmodified epoxy resin and the rubber-modified epoxy resin are used in combination, a mass ratio (rubber-modified epoxy resin: unmodified epoxy resin) of the rubber-modified epoxy resin to the unmodified epoxy resin is, for example, 0.1:99.9 to 99.9:0.1, preferably 1:99 to 99:1, more preferably 10:90 to 90:10, further more preferably 60:40 to 40:60.

The filler is a hard filler, and is, for example, uniformly dispersed in the core material layer 30. Examples of the filler include calcium carbonate (for example, heavy calcium carbonate, light calcium carbonate, Hakuenka, or the like), calcium oxide, talc, mica, clay, mica powder, bentonite, silica (for example, hydrophobic silica or the like), alumina, aluminum silicate, aluminum hydroxide, titanium oxide, barium titanate, ferrite, carbon black, acetylene black, aluminum powder, glass powder, glass fiber, glass balloon, and chopped strands (for example, glass fiber, carbon fiber, aramid fiber, or the like). These fillers can be used alone or in combination of two or more.

Of these fillers, preferably, calcium carbonate is used, more preferably, heavy calcium carbonate is used.

A content ratio of the filler in the core material layer 30 is, for example, 15 mass % or more, preferably 40 mass % or more, more preferably 50 mass % or more, further more preferably 60 mass % or more, particularly preferably 70 mass % or more, and for example, below 85 mass %, preferably 80 mass % or less.

When the content ratio of the filler in the core material layer 30 is the above-described lower limit or more, a Young's modulus of the core material layer 30 can be adjusted within a preferable range (described later), so that the improvement of the maximum bending testing force of the reinforcement structure 1 can be achieved. When the content ratio of the filler in the core material layer 30 is below the above-described upper limit, the filler can be uniformly dispersed in the core material layer 30, and the core material layer 30 can be surely formed.

The core material layer 30 preferably further contains a latent curing agent as an optional component.

The latent curing agent is solid at room temperature (23° C.), and cures the core material resin at a predetermined temperature. The latent curing agent has, for example, activity at 80° C. or more and 200° C. or less.

Examples of the latent curing agent include urea compound, amine compound, acid anhydride compound, amide compound, cyano compound, dihydrazide compound, imidazole compound, and imidazoline compound.

Examples of the urea compound include 3-(3,4-dichlorophenyl)-1,1-dimethylurea (DCMU), N'-phenyl-N,N-dimethylurea, and 1,1'-(methyl-m-phenylene) bis(3,3'-dimethylurea).

Examples of the amine compound include ethylenediamine, propylenediamine, diethylenetriamine, triethylenetetramine, and amine adduct thereof, methaphenylenediamine, diaminodiphenyl methane, and diaminodiphenyl sulfone.

Examples of the acid anhydride compound include phthalic anhydride, maleic anhydride, tetrahydrophthalic anhydride, dodecenyl succinic anhydride, dichloro succinic anhydride, benzophenone tetracarboxylic anhydride, and chlorendic anhydride.

An example of the amide compound includes polyimide.

An example of the cyano compound includes dicyandiamide.

An example of the hydrazide compound includes dihydrazide such as adipic acid dihydrazide.

Examples of the imidazole compound include methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

Examples of the imidazoline compound include methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline.

These latent curing agents can be used alone or in combination of two or more.

Of these latent curing agents, preferably, a urea compound and a cyano compound are used, more preferably, a urea compound and a cyano compound are used in combination, further more preferably, DCMU and dicyandiamide are used in combination.

The content ratio of the latent curing agent with respect to 100 parts by mass of the core material resin is, for example, 0.5 parts by mass or more, preferably 1 part by mass or more, and for example, 30 parts by mass or less, preferably 20 parts by mass or less, more preferably 15 parts by mass or less.

Furthermore, in addition to the above-described components, as an optional component, for example, a known additive can be also added to the core material layer 30 at an appropriate ratio. Examples of the known additive include toughness imparting agent (for example, thermoplastic resins such as rubber, elastomer, urethane, and polyamide; core-shell-type acrylic polymer rubber particles, or the like), tackifier (for example, rosin resin, terpene resin, coumarone-indene resin, petroleum resin, or the like), lubricant (for example, stearic acid or the like), stabilizer, antiaging inhibitor, oxidation inhibitor, ultraviolet absorber, colorant, flame retardant, antistatic agent, conductivity imparting agent, sliding property imparting agent, and surfactant.

When the core material resin is in a cured state, the Young's modulus of the core material layer 30 is, for example, 600 MPa or more, preferably 1000 MPa or more, more preferably 2000 MPa or more, and for example, 7000 MPa or less. The Young's modulus can be calculated by the following formula (1) by using the result measured by the following tensile test (hereinafter, the same).

Tensile test: a sample (the core material layer) is cut out into a size of a width of 10 mm×a length of 100 mm. Then, the minimum thickness of the central portion of the sample is measured. Next, the sample is measured under the following test conditions.

Test conditions: distance between holder of 50 mm, tensile rate of 1 mm/min, room temperature of 23° C.

$$E = \frac{\Delta F}{S} \times \frac{L}{\Delta L} \tag{1}$$

ΔF: increase in load (0.1→0.4 mm displacement), S: cross-sectional area (thickness×width), L: initial length (50 mm), ΔL: increased amount of length When the Young's modulus of the core material layer 30 is the above-described lower limit or more, the improvement of reinforcement properties of the reinforcement sheet 3 with respect to the metal plate 2 can be surely achieved, and the improvement of the maximum bending testing force of the reinforcement structure 1 can be surely achieved. Thus, a reduction in thickness of the core material layer 30 can be achieved, and to be specific, when a thickness of the core material layer 30 is set within the following range, the maximum bending testing force of the reinforcement structure 1 can be sufficiently ensured.

The front layer 31 is positioned at the opposite side of the inner surface of the recessed portion 20 with respect to the core material layer 30, and is positioned at spaced intervals to the first surface 204, the first corner portion 20D, the second surface 20B, the second corner portion 20E, and the third surface 20C. The front layer 31 is disposed on the front surface of the core material layer 30.

The front layer 31 contains at least a plurality of fibers, and preferably, further contains a resin. In the following, the resin contained in the front layer 31 is referred to as a front layer resin.

Examples of the fiber include carbon fiber and glass fiber. These fibers can be used alone or in combination of two or more. Of these fibers, preferably, a carbon fiber is used.

The mass (basis weight) per unit area of the plurality of fibers in the front layer 31 is, for example, 10 g/m² or more, preferably 80 g/m² or more, and for example, 500 g/m² or less, preferably 200 g/m² or less.

The front layer resin is not particularly limited, and an example thereof includes a thermosetting resin. To be specific, examples of the thermosetting resin include epoxy resin, urethane resin, melamine resin, and phenol resin. These front layer resins can be used alone or in combination of two or more.

Of these front layer resins, preferably, an epoxy resin is used. As the epoxy resin used for the front layer resin, for example, the same epoxy resin as that used for the core material resin is used. These epoxy resins can be used alone or in combination of two or more.

The content ratio (resin content ratio) of the front layer resin in the front layer 31 is, for example, 10 mass % or more, preferably 20 mass % or more, and for example, 60 mass % or less, preferably 40 mass % or less.

The front layer 31 preferably contains the above-described latent curing agent at an appropriate ratio as an optional component.

The front layer 31 preferably contains a plurality of unidirectional fiber resin composite sheets, more preferably consists of a plurality of unidirectional fiber resin composite sheets.

Each of the plurality of unidirectional fiber resin composite sheets contains the above-described plurality of fibers and the above-described front layer resin. Each of the plurality of unidirectional fiber resin composite sheets is formed by subjecting the front layer resin to impregnation treatment of a fiber substrate consisting of the plurality of fibers.

As shown in FIG. 2A, before the reinforcement sheet 3 adheres to the metal plate 2, and in a state in which the reinforcement sheet 3 has a flat plate shape, the plurality of fibers extend in the same direction perpendicular to a thickness direction of the reinforcement sheet 3 (hereinafter, referred to as a fiber direction) in each of the plurality of unidirectional fiber resin composite sheets. The plurality of fibers are arranged in the direction perpendicular to the fiber direction so as to be generally parallel with each other in each of the unidirectional fiber resin composite sheets.

The plurality of unidirectional fiber resin composite sheets are laminated so that the fiber directions of the unidirectional fiber resin composite sheets that are next to each other cross (for example, are perpendicular to) each other.

When the fiber direction is in a state of being orientated in a tensile direction, a tensile strength per one layer of the plurality of unidirectional fiber resin composite sheets is, for example, 100 MPa or more, preferably 300 MPa or more, and for example, 7000 MPa or less. The tensile strength can be calculated by measuring the maximum testing force (the maximum value of a load in a tensile test) of a sample (the unidirectional fiber resin composite sheet), and dividing the obtained maximum testing force by the cross-sectional area (thickness×width) of the sample in conformity with the above-described tensile test (hereinafter, the same).

When the tensile strength of each of the unidirectional fiber resin composite sheets is the above-described lower limit or more, the improvement of the reinforcement properties of the reinforcement sheet 3 with respect to the metal plate 2 can be furthermore surely achieved, and the improvement of the maximum bending testing force of the reinforcement structure 1 can be furthermore surely achieved.

Each of the unidirectional fiber resin composite sheets has a thickness of, for example, 0.01 mm or more, preferably 0.05 mm or more, and for example, 0.5 mm or less, preferably 0.3 mm or less.

The number (number of lamination) of the plurality of unidirectional fiber resin composite sheets is, for example, two or more, preferably three or more, and for example, below 10.

When the number (number of lamination) of the plurality of unidirectional fiber resin composite sheets is the above-described lower limit or more, the reinforcement properties of the reinforcement sheet 3 with respect to the metal plate 2 can be ensured. When the number (number of lamination) of the plurality of unidirectional fiber resin composite sheets is the above-described upper limit or less, the number of lamination of the plurality of unidirectional fiber resin composite sheets can be reduced, and a reduction in production cost of the front layer 31 can be achieved.

As shown in FIG. 1, the adhesive layer 32 is disposed between the core material layer 30 and the inner surface of the recessed portion 20. The adhesive layer 32 allows the core material layer 30 to adhere to the inner surface of the recessed portion 20. That is, the core material layer 30 adheres to the recessed portion 20 via the adhesive layer 32. The adhesive layer 32 is in direct contact with the first surface 20A, the first corner portion 20D, the second surface 20B, the second corner portion 20E, and the third surface 20C, and is provided along those. The adhesive layer 32 is, for example, formed from a known adhesive or a double-coated adhesive tape.

Examples of an adhesive that forms the adhesive layer 32 include epoxy adhesive, urethane adhesive, and acrylic adhesive. These adhesives can be used alone or in combination of two or more.

The double-coated adhesive tape that forms the adhesive layer 32 includes, for example, a substrate, and the above-described adhesive that is laminated on both surfaces of the substrate. An example of the double-coated adhesive tape that forms the adhesive layer 32 includes a thermosetting double-coated tape NA590 manufactured by NITTO DENKO CORPORATION. The adhesive layer 32 is preferably formed from a double-coated adhesive tape.

2. Details of Core Material Layer and Front Layer

Next, the details of the core material layer 30 and the front layer 31 are described.

The core material layer 30 integrally includes a first portion 30A along the first surface 20A, a second portion 30B along the second surface 20B, a third portion 30C along the first corner portion 20D, a fourth portion 30D along the third surface 20C, and a fifth portion 30E along the second corner portion 20E. That is, the first portion 30A, the second portion 30B, the third portion 30C, the fourth portion 30D, and the fifth portion 30E are integrated.

The first portion 304 is positioned at the opposite side of the first surface 20A with respect to the adhesive layer 32. The first portion 30A is positioned between the first surface 20A and a first front layer portion 31A (described later). Of the core material layer 30 adhering to the first surface 20A by the adhesive layer 32, the first portion 30A is a portion at one side in the first direction, and is a portion that is overlapped with the first front layer portion 31A (described later) when projected in the second direction.

The second portion 30B is positioned at the opposite side of the second surface 20B with respect to the adhesive layer 32. The second portion 30B is positioned between the second surface 20B and a second front layer portion 31B (described later). Of the core material layer 30 adhering to the second surface 20B by the adhesive layer 32, the second portion 30B is a central portion in the second direction, and is a portion that is overlapped with the second front layer portion 31B (described later) when projected in the first direction.

The third portion 30C is disposed between the first portion 30A and the second portion 30B. In an enlarged view of FIG. 1, the first portion 30A, the second portion 30B, and the third portion 30C are shown by being defined by a phantom line for convenience. The third portion 30C is continuous to the first portion 30A and the second portion 30B, and to be more specific, is continuous to the other end portion in the first direction of the first portion 30A and one end portion in the second direction of the second portion 30B. The third portion 30C is positioned closer to the first corner portion 20D compared to the first portion 30A in the first direction, and is positioned closer to the first corner portion 20D compared to the second portion 30B in the second direction. The third portion 30C is positioned between the first corner portion 20D and a third front layer portion 31C (described later).

A thickness of the third portion 30C along the second direction is thicker than that of the first portion 30A along the second direction. To be more specific, in the first direction, the thickness of the third portion 30C along the second direction gets thicker from a continuous portion of the first portion 30A toward the other side in the first direction, and thereafter, is fixed when it reaches a continuous portion to the second portion 30B. The thickness of the third portion 30C along the second direction is a size of the third portion 30C in the second direction in the cross-section when the reinforcement structure 1 is cut in the first direction and the second direction.

A thickness of the third portion 30C along the first direction is thicker than that of the second portion 30B along the first direction. To be more specific, the thickness of the third portion 30C along the first direction gets thicker from the continuous portion of the second portion 30B toward one side in the second direction, and thereafter, is fixed when it reaches the continuous portion to the first portion 30A. The thickness of the third portion 30C along the first direction is a size of the third portion 30C in the first direction in the cross-section when the reinforcement structure 1 is cut in the first direction and the second direction.

The fourth portion 30D is positioned at the opposite side of the third surface 20C with respect to the adhesive layer 32. The fourth portion 30D is positioned between the third surface 20C and a fourth front layer portion 31D (described later). The fourth portion 30D is positioned at spaced intervals to the first portion 30A at the other side in the second direction. Of the core material layer 30 adhering to the third surface 20C by the adhesive layer 32, the fourth portion 30D is a portion at one side in the first direction, and is a portion that is overlapped with the fourth front layer portion 31D (described later) when projected in the second direction.

The fifth portion 30E is disposed between the second portion 30B and the fourth portion 30D. The fifth portion 30E is continuous to the second portion 30B and the fourth portion 30D, and to be more specific, is continuous to the other end portion in the second direction of the second portion 30B and the other end portion in the first direction of the fourth portion 30D. The fifth portion 30E is positioned closer to the second corner portion 20E compared to the fourth portion 30D in the first direction, and is positioned closer to the second corner portion 20E compared to the second portion 30B in the second direction. The fifth portion 30E is positioned between the second corner portion 20E and a fifth front layer portion 31E (described later).

A thickness of the fifth portion 30E along the second direction is thicker than that of the fourth portion 30D along the second direction. To be more specific, the thickness of the fifth portion 30E along the second direction gets thicker from a continuous portion of the fourth portion 30D toward the other side in the first direction, and thereafter, is fixed when it reaches the continuous portion to the second portion 30B.

A thickness of the fifth portion 30E along the first direction is thicker than that of the second portion 30B along the first direction. To be more specific, the thickness of the fifth portion 30E along the first direction gets thicker from the continuous portion of the second portion 30B toward the other side in the second direction, and thereafter, is fixed when it reaches the continuous portion to the fourth portion 30D. The fifth portion 30E has a shape linearly symmetrical with respect to the third portion 30C.

The front layer 31 integrally includes the first front layer portion 31A, the second front layer portion 31B, the third front layer portion 31C, the fourth front layer portion 31D, and the fifth front layer portion 31E.

The first front layer portion 31A is positioned at spaced intervals to the first surface 20A in the second direction. The first front layer portion 31A is positioned at the opposite side of the first surface 20A with respect to the first portion 30A, and is disposed on the first portion 30A.

The first front layer portion 31A extends in the first direction. Extension of the first front layer portion 31A in the first direction includes a case where the direction in which the first front layer portion 31A extends is parallel with the first direction and a case where the direction in which the first front layer portion 31A extends inclines with respect to the first direction at an angle of, for example, 1° or more and 30° or less. That is, an angle made between the direction in which the first front layer portion 31A extends and the first direction is, for example, 0° or more and 30° or less.

The second front layer portion 31B is positioned at spaced intervals to the second surface 20B in the first direction. The second front layer portion 31B is positioned at the opposite side of the second surface 20B with respect to the second portion 30B, and is disposed on the second portion 30B.

The second front layer portion 31B extends in the second direction. The extension of the second front layer portion 31B in the second direction includes a case where the direction in which the second front layer portion 31B extends is parallel with the second direction and a case where the direction in which the second front layer portion 31B extends inclines with respect to the second direction at an angle of, for example, 1° or more and 30° or less. That is, an angle made between the direction in which the second front layer portion 31B extends and the second direction is, for example, 0° or more and 30° or less.

The third front layer portion 31C is positioned at spaced intervals to the first corner portion 20D in the third direction crossing both directions of the first direction and the second direction. The third front layer portion 31C is positioned at the opposite side of the first corner portion 20D with respect to the third portion 30C, and is disposed on the third portion 30C. The third front layer portion 31C connects the first front layer portion 31A to the second front layer portion 31B. To be more specific, the third front layer portion 31C connects the other end portion in the first direction of the first front layer portion 31A to one end portion in the second direction of the second front layer portion 31B.

The third front layer portion 31C extends in a direction perpendicular to the third direction so as to cross over the first corner portion 20D when viewed in the third direction. To be more specific, the third front layer portion 31C inclines from one side toward the other side in the second direction as it goes from one side toward the other side in the first direction.

The direction in which the third front layer portion 31C extends greatly inclines with respect to the first direction compared to the direction in which the first front layer portion 31A extends. An angle made between the direction in which the third front layer portion 31C extends and the first direction is, for example, 20° or more, preferably above 30°, and for example, below 90°.

The direction in which the third front layer portion 31C extends greatly inclines with respect to the second direction compared to the direction in which the second front layer portion 31B extends. An angle made between the direction in which the third front layer portion 31C extends and the second direction is, for example, 20° or more, preferably above 30°, and for example, below 90°.

A gap between the first surface 20A and the third front layer portion 31C in the second direction gradually increases as it gets closer to the first corner portion 20D in the first direction with respect to a gap between the first surface 20A and the first front layer portion 31A in the second direction.

The gap between the first surface 20A and the third front layer portion 31C in the second direction is a size of the gap between the first surface 20A and the third front layer portion 31C in the cross section when the reinforcement structure 1 is cut in the first direction and the second direction.

A gap between the second surface 20B and the third front layer portion 31C in the first direction gradually increases as it gets closer to the first corner portion 20D in the second direction with respect to a gap between the second surface 20B and the second front layer portion 31B in the first direction.

The gap between the second surface 20B and the third front layer portion 31C in the first direction is a size of the gap between the second surface 20B and the third front layer portion 31C in the cross section when the reinforcement structure 1 is cut in the first direction and the second direction.

The fourth front layer portion 31D is positioned at spaced intervals to the third surface 20C in the second direction. The fourth front layer portion 31D is positioned at the opposite side of the third surface 20C with respect to the fourth portion 30D, and is disposed on the fourth portion 30D. The fourth front layer portion 31D is disposed at spaced intervals to the first front layer portion 31A at the opposite side in the second direction.

The fourth front layer portion 31D extends in the first direction. The extension of the fourth front layer portion 31D in the first direction includes a case where the direction in which the fourth front layer portion 31D extends is parallel with the first direction and a case where the direction in which the fourth front layer portion 31D extends inclines with respect to the first direction at an angle of, for example, 1° or more and 30° or less. That is, an angle made between the direction in which the fourth front layer portion 31D extends and the first direction is, for example, 0° or more and 30° or less.

The fifth front layer portion 31E is positioned at spaced intervals to the second corner portion 20E in the direction crossing both directions of the first direction and the second direction. The fifth front layer portion 31E is positioned at the opposite side of the second corner portion 20E with respect to the fifth portion 30E, and is disposed on the fifth portion 30E. The fifth front layer portion 31E connects the fourth front layer portion 31D to the second front layer portion 31B. To be more specific, the fifth front layer portion 31E connects the other end portion in the first direction of the fourth front layer portion 31D to the other end portion in the second direction of the second front layer portion 31B. The fifth front layer portion 31E has a shape linearly symmetrical with respect to the third front layer portion 31C.

The direction in which the fifth front layer portion 31E extends greatly inclines with respect to the first direction compared to the direction in Which the fourth front layer portion 31D extends. An angle made between the direction in which the fifth front layer portion 31E extends and the first direction is, for example, 20° or more, preferably above 30°, and for example, below 90°.

The direction in which the fifth front layer portion 31E extends greatly inclines with respect to the second direction compared to the direction in which the second front layer portion 31B extends. An angle made between the direction in which the fifth front layer portion 31E extends and the second direction is, for example, 20° or more, preferably above 30°, and for example, below 90°.

3. Producing Method of Reinforcement Structure

Next, a method for producing the reinforcement structure 1 as a first embodiment of a method for producing a reinforcement structure of the present invention is described with reference to FIGS. 2A to 3B. The direction of the reinforcement structure 1 shown in FIG. 1 is reverse to that of the reinforcement structure 1 produced in FIGS. 2A to 3B. Thus, in FIGS. 2A to 3B, the lower side on the plane of the sheet is one side in the first direction, the upper side on the plane of the sheet is the other side in the first direction, the right side on the plane of the sheet is one side in the second direction, and the left side on the plane of the sheet is the other side in the second direction.

The method for producing the reinforcement structure 1 includes a step of preparing the reinforcement sheet 3 (ref: FIGS. 2A and 2B), a step of preparing the metal plate 2 (ref FIG. 2C), a step of attaching the reinforcement sheet 3 to the metal plate 2 (ref FIG. 3A), and a step of removing a mold 4 from the reinforcement structure 1 (ref: FIG. 3B).

In the method for producing the reinforcement structure 1, first, as shown in FIG. 2A, the reinforcement sheet 3 including the core material layer 30 and the front layer 31 is prepared. The reinforcement sheet 3 before adhering to the metal plate 2 is distinguished from the reinforcement sheet 3 after adhering to the metal plate 2 as a pre-adhesion reinforcement sheet 3X. The core material layer 30 included in the pre-adhesion reinforcement sheet 3X is defined as a pre-adhesion core material layer 30X, and the front layer 31 included in the pre-adhesion reinforcement sheet 3X is defined as a pre-adhesion front layer 31X.

The pre-adhesion reinforcement sheet 3X has a flat plate shape, to be specific, has a predetermined thickness, extends in a predetermined direction perpendicular to the thickness direction, and has a flat front surface and a flat rear surface.

The pre-adhesion reinforcement sheet 3X includes the pre-adhesion core material layer 30X, the pre-adhesion front layer 31X, and the above-described adhesive layer 32. The pre-adhesion reinforcement sheet 3X preferably further includes a release layer 33.

The pre-adhesion core material layer 30X has a thin layer shape, and has a flat front surface and a flat rear surface. The core material layer 30 contains at least the above-described core material resin, preferably further contains the above-described filler, and if necessary, further contains the above-described optional component. The core material resin contained in the pre-adhesion core material layer 30X is desirably in an uncured state in the case of the thermosetting resin.

The pre-adhesion core material layer 30X has a fixed thickness over the whole layer. The pre-adhesion core material layer 30X has a thickness of, for example, 0.1 mm or more, preferably 1 mm or more, and for example, 20 mm or less, preferably 10 mm or less, more preferably 2 mm or less.

The pre-adhesion front layer 31X is disposed at one side in the first direction of the pre-adhesion core material layer 30X (one side in the thickness direction). The pre-adhesion front layer 31X has a thin layer shape, and has a flat front surface and a flat rear surface. The pre-adhesion front layer 31X contains at least the above-described plurality of fibers, preferably further contains the above-described front layer resin, and if necessary, further contains the above-described optional component. The front layer resin contained in the pre-adhesion front layer 31X is desirably in an uncured state in the case of the thermosetting resin.

The pre-adhesion front layer 31X has a thickness of, for example, 0.02 mm or more, preferably 0.15 mm or more, and for example, 5 mm or less, preferably 1 mm or less, more preferably 0.5 mm or less.

The adhesive layer 32 is disposed at the other side in the first direction of the pre-adhesion core material layer 30X (the other side in the thickness direction).

The adhesive layer 32 has a thickness of, for example, 0.05 mm or more, preferably 0.1 mm or more, and for example, 1 mm or less, preferably 0.5 mm or less.

The release layer 33 is disposed at the opposite side of the adhesive layer 32 with respect to the pre-adhesion front layer 31X. The release layer 33 is releasably attached to the front surface of the adhesive layer 32 so as to protect the adhesive layer 32 until the pre-adhesion reinforcement sheet 3X is used for the production of the reinforcement structure 1.

The attached surface of the release layer 33 is subjected to release treatment as needed. Examples of a material for the release layer 33 include resin materials such as polyester (for example, polyethylene terephthalate (PET) or the like), polyolefin (for example, polyethylene, polypropylene, or the like), and fluorine resin (for example, polytetrafluoroethylene (PTFE) or the like) and resin coat paper. Preferably, polyethylene terephthalate is used.

The release layer 33 may not be provided on the front surface of the adhesive layer 32. In this case, the adhesive layer 32 is exposed.

Although not shown, a release layer may be provided on the front surface of the pre-adhesion front layer 31X.

Next, as shown in FIG. 2B, the pre-adhesion reinforcement sheet 3X is preliminarily shaped as needed. The pre-adhesion reinforcement sheet 3X is preliminarily shaped by, for example, the mold 4 having a shape corresponding to the metal plate 2.

The mold 4 integrally includes a base portion 40 and a protruding portion 41.

The base portion 40 has a flat plate shape extending in the second direction, The protruding portion 41 protrudes from the base portion 40 toward the other side in the first direction. The protruding portion 41 has a shape that is capable of being inserted into the recessed portion 20 in the metal plate 2, and has a first mold surface 41A, a second mold surface 41B, a third mold surface 41C, a fourth mold surface 41D, and a fifth mold surface 41E.

The first mold surface 41A is one end surface in the second direction of the protruding portion 41, and extends in the first direction corresponding to the first surface 20A. The second mold surface 41B is the other end surface in the first direction of the protruding portion 41, and extends in the second direction corresponding to the second surface 20B.

The third mold surface 41C connects the first mold surface 41A to the second mold surface 41B, and extends in a direction perpendicular to the third direction (ref: FIG. 1). To be more specific, the third mold surface 41C connects the other end portion in the first direction of the first mold surface 41A to one end portion in the second direction of the second mold surface 41B. The third mold surface 41C inclines from the other side toward one side in the second direction as it goes from the other side toward one side in the first direction.

The fourth mold surface 41D is the other end surface in the second direction of the protruding portion 41, and extends in the first direction corresponding to the third surface 20C. The fifth mold surface 41E connects the fourth mold surface 41D to the second mold surface 41B, and extends in a direction crossing both directions of the first direction and the second direction. To be more specific, the fifth mold surface 41E connects the other end portion in the first direction of the fourth mold surface 41D to the other end portion in the second direction of the second mold surface 41B. The fifth mold surface 41E inclines from the other side toward one side in the second direction as it goes from one side toward the other side in the first direction.

To preliminarily shape the pre-adhesion reinforcement sheet 3X by the mold 4, the reinforcement sheet 3 is pressed along the protruding portion 41 to be preliminarily heated so that the front layer 31 is positioned at the side of the protruding portion 41.

A preliminarily heating temperature is, for example, 30° C. or more, preferably 40° C. or more, and for example, 120° C. or less, preferably 80° C. or less. The preliminarily heating time is, for example, 15 seconds or more, and for example, 5 minutes or less.

In this manner, the reinforcement sheet 3 is preliminarily shaped into a generally U-shape having an opening toward one side in the first direction.

Thereafter, the release layer 33 is peeled from the adhesive layer 32 to expose the adhesive layer 32.

Next, as shown in FIG. 2C, the above-described metal plate 2 is prepared.

Figure 3A:
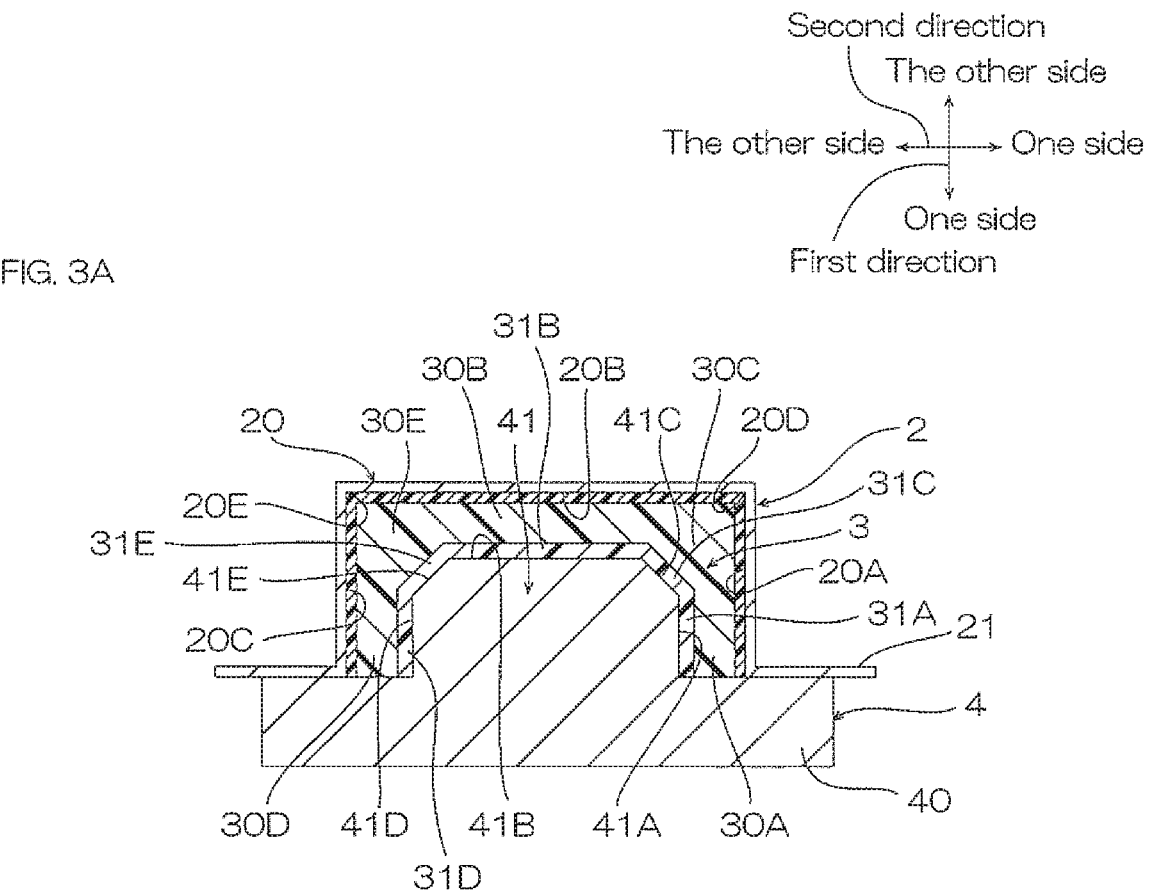
FIG. 3A, subsequent to FIG. 2C, shows a step of attaching the reinforcement sheet to the metal plate.
Figure 3B:
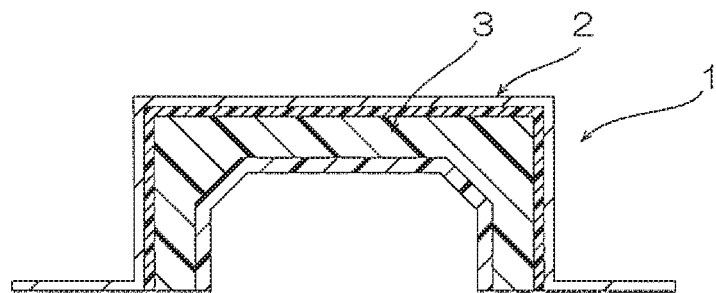
FIG. 3B, subsequent to FIG. 3A, shows a step of removing a mold from the reinforcement structure.

Next, as shown in FIG. 3A, the reinforcement sheet 3 is attached to the metal plate 2 so that the core material layer 30 is positioned between the inner surface (the first surface 20A, the first corner portion 20D, the second surface 20B, the second corner portion 20E, and the third surface 20C) of the recessed portion 20 and the front layer 31, and the front layer 31 is positioned at spaced intervals to the inner surface (the first surface 20A, the first corner portion 20D, the second surface 20B, the second corner portion 20E, and the third surface 20C) of the recessed portion 20.

To be more specific, first, the reinforcement sheet 3 is heated at an attachment temperature.

The attachment temperature is a temperature at which the latent curing agent substantially reacts or more, and is, for example, 80° C. or more, preferably 120° C. or more, and for example, 250° C. or less, preferably 200° C. or less.

The metal plate 2 is pressed toward the mold 4 so that the reinforcement sheet 3 and the protruding portion 41 are fitted into the recessed portion 20. In other words, the reinforcement sheet 3 is pressed toward the metal plate 2 by the mold 4 having a shape corresponding to the metal plate 2.

At this time, the core material layer 30 is pressed by the metal plate 2 and flows so as to be along the inner surface (the first surface 20A, the first corner portion 20D, the second surface 20B, the second corner portion 20E, and the third surface 20C) of the recessed portion 20, while the adhesive layer 32 adheres to the inner surface of the recessed portion 20.

In this manner, the first portion 30A is formed between the first mold surface 41A and the first surface 20A; the second portion 30B is formed between the second mold surface 41B and the second surface 20B; the third portion 30C is formed between the first corner portion 20D and the third mold surface 41C; the fourth portion 30D is formed between the fourth mold surface 41D and the third surface 20C; and the fifth portion 30E is formed between the second corner portion 20E and the fifth mold surface 41E.

In other words, the core material layer 30 flows so that in the core material layer 30, the thickness along the second direction of the third portion 30C along the first corner portion 20D is thicker than the thickness along the second direction of the first portion 30A along the first surface 20A, and the thickness of the third portion 30C along the first direction is thicker than the thickness along the first direction of the second portion 30B along the second surface 20B.

Also, the first front layer portion 31A is disposed so as to be positioned at spaced intervals to the first surface 20A in the second direction, and extend in the first direction; the second front layer portion 31B is disposed so as to be positioned at spaced intervals to the second surface 20B in the first direction, and extend in the second direction; the third front layer portion 31C is disposed at spaced intervals to the first corner portion 20D; the fourth front layer portion 31D is disposed so as to be positioned at spaced intervals to the third surface 20C in the second direction, and extend in the first direction; and the fifth front layer portion 31E is disposed at spaced intervals to the second corner portion 20E.

The gap between the first surface 20A and the third front layer portion 31C in the second direction is formed so as to gradually increase as it gets closer to the first corner portion 20D in the first direction with respect to the gap between the first surface 20A and the first portion 30A in the second direction.

The gap between the second surface 20B and the third front layer portion 31C in the first direction is formed so as to gradually increase as it gets closer to the first corner portion 20D in the second direction with respect to the gap between the second surface 20B and the second front layer portion 31B in the first direction.

In other words, the third front layer portion 31C is disposed so that the gap between the first surface 20A and the third front layer portion 31C in the second direction and the gap between the second surface 20B and the third front layer portion 31C in the first direction are the description above.

Thereafter, the above-described attachment temperature is retained for a predetermined attachment time.

The attachment time is, for example, one second or more, preferably 10 seconds or more, and for example, 60 minutes or less, preferably 30 minutes or less.

In this manner, each of the core material resin of the core material layer 30 and the front layer resin of the front layer 31 is cured (is brought into a cured state) in the case of an uncured state before heating, while the adhesive layer 32 is cured.

In this manner, the reinforcement sheet 3 adheres to the metal plate 2 to reinforce the metal plate 2, and the reinforcement structure 1 including the metal plate 2 and the reinforcement sheet 3 is produced.

Thereafter, as shown in FIG. 3B, if necessary, the reinforcement structure 1 is cooled, and thereafter, the mold 4 is removed from the reinforcement structure 1.

As shown in FIG. 1, in the reinforcement structure 1, the third front layer portion 31C of the front layer 31 is positioned at spaced intervals to the first corner portion 20D in the third direction; the gap between the first surface 20A and the third front layer portion 31C in the second direction gradually increases as it gets closer to the first corner portion 20D in the first direction with respect to the gap between the first surface 20A and the first front layer portion 31A in the second direction; and the gap between the second surface 20B and the third front layer portion 31C in the first direction gradually increases as it gets closer to the first corner portion 20D in the second direction with respect to the gap between the second surface 20B and the second front layer portion 31B in the first direction.

Thus, the reinforcement sheet 3 can intensively reinforce the first corner portion 20D of the metal plate 2, and accordingly, the improvement of the strength of the reinforcement structure 1 can be achieved.

To be specific, the maximum bending testing force at room temperature (23° C.) of the reinforcement structure 1 is, for example, 10 kN or more, preferably 12 kN or more. The maximum bending testing force can be measured in conformity with the method described in Examples (hereinafter, the same).

The third portion 30C of the core material layer 30 is along the first corner portion 20D, the thickness of the third portion 30C along the second direction is thicker than that of the first portion 30A along the second direction, and the thickness of the third portion 30C along the first direction is thicker than that of the second portion 30B along the first direction.

That is, the third portion 30C that is positioned near the first corner portion 20D is thicker than both portions of the first portion 30A along the first surface 20A and the second portion 30B along the second surface 20B.

Thus, the reinforcement sheet 3 can more intensively reinforce the first corner portion 20D of the metal plate 2, and accordingly, the improvement of the strength of the reinforcement structure 1 can be surely achieved.

In the core material layer 30, the first portion 30A, the second portion 30B, the third portion 30C, the fourth portion 30D, and the fifth portion 30E are integrated. Thus, compared to a case where each of the portions of the core material layer 30 is a separate piece, a reduction of the number of components can be achieved. Also, the improvement of relative position accuracy of each of the portions of the core material layer 30 can be achieved, and the first corner portion 20D can be more stably intensively reinforced.

The fifth portion 30E of the core material layer 30 is along the second corner portion 20E, the thickness of the fifth portion 30E along the second direction is thicker than that of the fourth portion 30D along the second direction, and the thickness of the fifth portion 30E along the first direction is thicker than that of the second portion 30B along the first direction.

That is, the fifth portion 30E that is positioned near the second corner portion 20E is thicker than both portions of the fourth portion 30D along the third surface 20C and the second portion 30B along the second surface 20B.

Thus, even when the metal plate 2 has the first corner portion 20D and the second corner portion 20E, the reinforcement sheet 3 can intensively reinforce both of the first corner portion 20D and the second corner portion 20E, and accordingly, the improvement of the strength of the reinforcement structure 1 can be furthermore surely achieved.

The adhesive layer 32 is disposed between the core material layer 30 and the metal plate 2. Thus, the core material layer 30 can surely adhere to the metal plate 2. As a result, the reinforcement sheet 3 can stably reinforce the metal plate 2.

As shown in FIG. 3A, in the method for producing the reinforcement structure 1, in the step of attaching the reinforcement sheet 3 to the metal plate 2, the third front layer portion 31C is disposed so that the gap between the first surface 20A and the third front layer portion 31C in the second direction gradually increases as it gets closer to the first corner portion 20D in the first direction with respect to the gap between the first surface 20A and the first front layer portion 31A in the second direction, and the gap between the second surface 20B and the third front layer portion 31C in the first direction gradually increases as it gets closer to the first corner portion 20D in the second direction with respect to the gap between the second surface 20B and the second front layer portion 31B in the first direction.

That is, in the step of attaching the reinforcement sheet 3 to the metal plate 2, the third front layer portion 31C in the front layer 31 can be disposed as described above, so that the reinforcement structure 1 having the improved strength can be smoothly produced.

In the step of attaching the reinforcement sheet 3 to the metal plate 2, the core material layer 30 containing the resin flows, so that the thickness along the second direction of the third portion 30C along the first corner portion 20D is thicker than the thickness along the second direction of the first portion 30A along the first surface 20A, and the thickness of the third portion 30C along the first direction is thicker than the thickness along the first direction of the second portion 30B along the second surface 20B.

Thus, the third portion 30C of the core material layer 30 can be smoothly formed so as to have the above-described thickness by an easy method.

The third mold surface 41C of the mold 4 connects the first mold surface 41A to the second mold surface 41B, and extends in a direction crossing the third direction in which the first corner portion 20D faces the third front layer portion 31C.

Thus, when the reinforcement sheet 3 is pressed toward the metal plate 2 by the mold 4, space for disposing the third front layer portion 31C can be ensured between the first corner portion 20D and the third mold surface 41C. As a result, in the step of attaching the reinforcement sheet 3 to the metal plate 2, the third front layer portion 31C can be smoothly disposed as described above.

Second Embodiment

Figure 4:
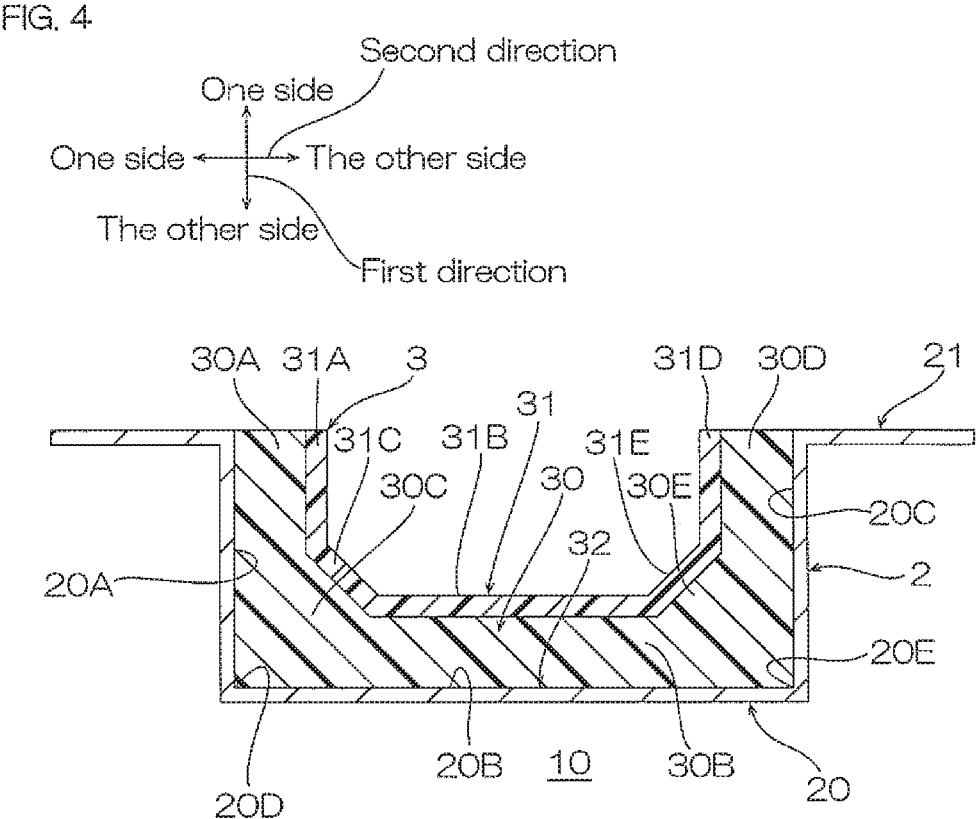
FIG. 4 shows a cross-sectional view of a second embodiment of a reinforcement structure of the present invention.

Next, a reinforcement structure 10 as a second embodiment of a reinforcement structure of the present invention is described with reference to FIG. 4. The same reference numerals are provided for members and steps corresponding to each of those in the above-described first embodiment, and their detailed description is omitted.

As shown in FIG. 1, the reinforcement structure 1 includes the adhesive layer 32. However, the reinforcement structure of the present invention may not include the adhesive layer. As shown in FIG. 4, the reinforcement structure 10 does not include the adhesive layer 32, and the core material layer 30 is in direct contact with the inner surface (each of the first surface 20A, the first corner portion 20D, the second surface 20B, the second corner portion 20E, and the third surface 20C) of the recessed portion 20.

According to the second embodiment, the core material layer 30 is in direct contact with the inner surface of the recessed portion 20, so that compared to a structure including the adhesive layer 32, a reduction of the number of components can be achieved, and the arrangement can be achieved so that the core material layer 30 (each of the first portion 30A, the second portion 30B, the third portion 30C, the fourth portion 30D, and the fifth portion 30E) is surely along the inner surface (each of the first surface 20A, the second surface 20B, the first corner portion 20D, the third surface 20C, and the second corner portion 20E) of the recessed portion 20.

In the second embodiment, the same function and effect as that of the first embodiment can be achieved.

Third Embodiment

Next, a reinforcement structure 11 as a third embodiment of a reinforcement structure of the present invention is described with reference to FIG. 5. The same reference numerals are provided for members and steps corresponding to each of those in the above-described first embodiment, and their detailed description is omitted.

As shown in FIG. 1, in the reinforcement structure 1, in the first corner portion 20D, the other end portion in the first direction of the first surface 20A and one end portion in the second direction of the second surface 20B form an angle of about 90°. However, the structure of the first corner portion is not limited to this.

Figure 5:
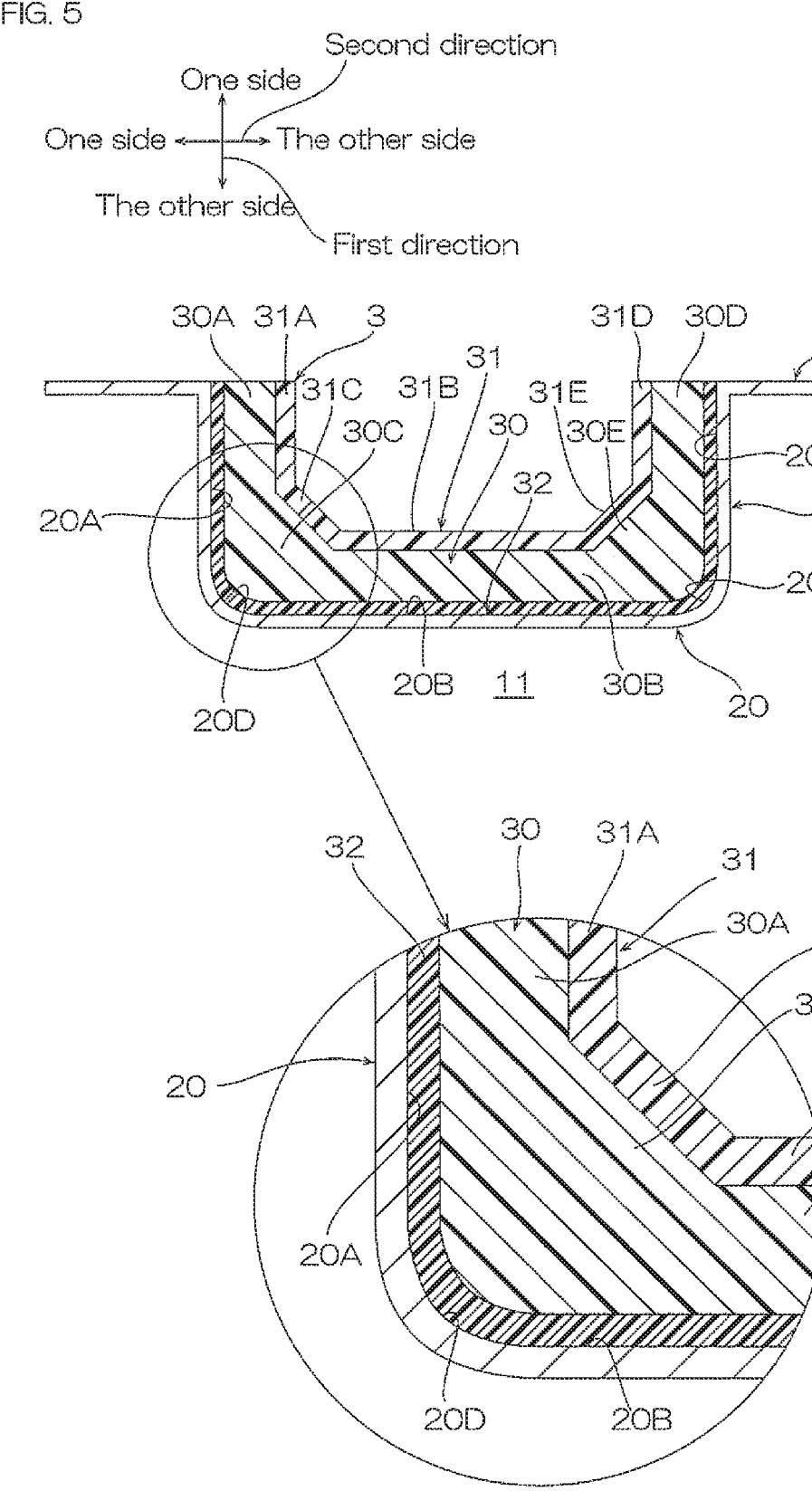
FIG. 5 shows a cross-sectional view of a third embodiment of a reinforcement structure of the present invention.

As shown in FIG. 5, in the reinforcement structure 11, the first corner portion 20D has a circular arc shape. To be more specific, the first corner portion 20D is continuous from the other end portion in the first direction of the first surface 20A to curve toward the other side in the second direction as it goes toward the other side in the first direction. Then, the first corner portion 20D is connected to one end portion in the second direction of the second surface 20B. Also, the second corner portion 20E may have a circular arc shape as in the same manner as the first corner portion 20D.

In the third embodiment, the same function and effect as that of the first embodiment can be achieved.

Fourth Embodiment

Next, a reinforcement structure 12 as a fourth embodiment of a reinforcement structure of the present invention is described with reference to FIG. 6. The same reference numerals are provided for members and steps corresponding to each of those in the above-described first embodiment, and their detailed description is omitted.

In the first to third embodiments, the third portion 30C is along the first corner portion 20D, and the third portion 30C is in tight contact with the first corner portion 20D via the adhesive layer 32. However, the present invention is not limited to this.

In the fourth embodiment, the third portion 30C is not along the first corner portion 20D, and space S is formed between the first corner portion 20D and the third portion 30C (to be more specific, the adhesive layer 32). The thickness of the third portion 30C (thickness in the third direction) is generally the same as the thickness in the second direction of the first portion 30A and the thickness in the first direction of the second portion 30B.

In the fourth embodiment, as described above, when each of the gap between the first surface 20A and the third front layer portion 31C in the second direction and the gap between the second surface 20B and the third front layer portion 31C in the first direction is configured so as to gradually increase as it gets closer to the first corner portion 20D, the same function and effect as that of the above-described first embodiment can be achieved. In view of improvement of the strength of the reinforcement structure 1, the first embodiment is more preferable.

Also, space may be formed between the second corner portion 20E and the fifth portion 30E in the same manner as the description above.

Modified Examples

In each of the modified examples below, the same reference numerals are provided for members and steps corresponding to each of those in the above-described first embodiment, and their detailed description is omitted.

As shown in FIG. 2A, in the first embodiment, the pre-adhesion core material layer 30X has a fixed thickness over the whole layer. However, the pre-adhesion core material layer 30X is not limited to this.

Figure 7:
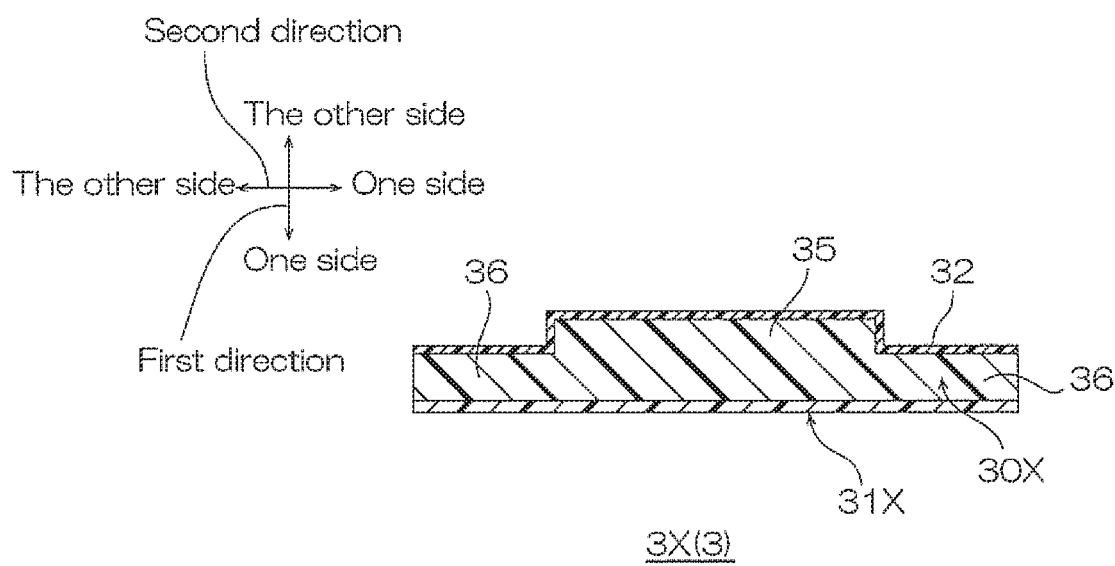
FIG. 7 shows a side cross-sectional view of a modified example (embodiment in which a pre-adhesion core material layer has a thick portion) of the reinforcement sheet shown in FIG. 2A.

As shown in FIG. 7, the pre-adhesion core material layer 30X may also include a thick portion 35 and a thin portion 36.

The thick portion 35 is positioned in the center in the second direction in the pre-adhesion core material layer 30X. The thickness of the thick portion 35 is thicker than that of the thin portion 36. The thin portion 36 is positioned at both sides in the second direction with respect to the thick portion 35.

When the pre-adhesion reinforcement sheet 3X includes the pre-adhesion core material layer 30X, in the step of attaching the reinforcement sheet 3 to the metal plate 2, as referred to FIG. 3A, the thick portion 35 is sandwiched between the second surface 20B of the recessed portion 20 and the second mold surface 41B of the protruding portion 41, and a portion of the thick portion 35 smoothly flows toward the space between the first corner portion 20D and the third mold surface 41C and/or the space between the second corner portion 20E and the fifth mold surface 41E.

In this manner, the third portion 30C and/or the fifth portion 30E can be smoothly formed.

In the first embodiment, the first surface 20A, the second surface 20B, and the third surface 20C extend linearly. However, the shape of each of the surfaces is not limited to this, and may be curved.

In the first embodiment, the first front layer portion 31A, the second front layer portion 31B, the third front layer portion 31C, the fourth front layer portion 31D, and the fifth front layer portion 31E extend linearly. However, the shape of each of the portions is not limited to this, and may be curved.

In the first embodiment, the reinforcement sheet 3 adheres to the entire inner surface of the recessed portion 20. However, the adhesive region of the reinforcement sheet 3 is not limited to this, and the reinforcement sheet 3 may adhere to the inner surface of the recessed portion 20 so that a portion of the inner surface of the recessed portion 20 (for example, a one-side portion in the first direction of the first surface 20A and/or the third surface 20C or the like) is exposed. For example, in the first embodiment, the end surface of the reinforcement sheet 3 is flush with the one-side surface in the first direction of the flange portion 21. Alternatively, the end surface of the reinforcement sheet 3 may be positioned at the other side in the first direction with respect to the one-side surface in the first direction of the flange portion 21.

In the first embodiment, the metal plate 2 has a hat shape when viewed from the cross-sectional view. However, the shape of the metal plate 2 is not limited to this. The metal plate 2 may also have an L-shape when viewed from the cross-sectional view having only the first surface 20A, the second surface 20B, and the first corner portion 20D.

In the first to fourth embodiments, the metal plate 2 is used as one example of an adherend. However, the adherend is not limited to this, example thereof includes concrete.

Also, a substrate may be disposed between the front layer 31 and the core material layer 30 and/or between the adhesive layer 32 and the core material layer 30. Examples of the substrate include glass cloth, carbon cloth, synthetic resin non-woven fabric (for example, polypropylene resin non-woven fabric, polyethylene resin non-woven fabric, ester resin non-woven fabric, or the like), metal foil, carbon fiber of short fiber, glass fiber of short fiber, and polyester film.

An adhesive layer that is configured in the same manner as that of the adhesive layer 32 can be also disposed between the front layer 31 and the core material layer 30.

In the modified examples, the same function and effect as that of the first embodiment can be achieved.

The first to fourth embodiments and the modified examples can be appropriately used in combination.

EXAMPLES

Next, the present invention is further described based on Examples and Comparative Examples shown below The present invention is however not limited by these Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Example 1

1. Preparation of Front Layer

Unidirectional fiber resin composite sheets (four pieces) (manufactured by TORAY INDUSTRIES INC., thickness of 0.10 mm) were prepared. The unidirectional fiber resin composite sheet included a plurality of carbon fibers (CFUD, basis weight of 100 g/m$^2$) that extended in the same fiber direction and were arranged in a direction perpendicular to the fiber direction so as to be generally parallel with each other, and an epoxy resin (front layer resin, content ratio of 33 mass %) that was impregnated in the plurality of carbon fibers. When the front layer resin was in a cured state, the tensile strength of each of the unidirectional fiber resin composite sheets was 2500 MPa.

The plurality of unidirectional fiber resin composite sheets were laminated so that the fiber directions of the unidirectional fiber resin composite sheets that were next to each other were perpendicular to each other. Thereafter, the plurality of unidirectional fiber resin composite sheets were pressed so as to be sandwiched from the outside in the thickness direction, thereby preparing the front layer (pre-adhesion front layer)

2. Preparation of Core Material Layer

The following components were kneaded with a mixing roll, thereby preparing a resin composition. The components included 40 parts by mass of an unmodified epoxy resin (core material resin, uncured state, trade name: JER 828, epoxy equivalent of 184 g/eq. to 194 g/eg., manufactured by Mitsubishi Chemical Corporation); 23 parts by mass of a first CTBN-modified epoxy resin (core material resin, uncured state, trade name: EPR2000, epoxy equivalent of 215 g/eq., manufactured by ADEKA CORPORATION); 37 parts by mass of a second CTBN-modified epoxy resin (core material resin, uncured state, trade time: HypoxRA840, epoxy equivalent of 350 g/eq., manufactured by CVC Specialty Chemicals Inc.); 321 parts by mass of a filler (calcium carbonate); 2 parts by mass of a first latent curing agent (urea compound, trade name: DCMU-99, manufactured by Hodogaya Chemical Co., Ltd.); and 5 parts by mass of a second latent curing agent (dicyandiamide, trade name: DDA-50, manufactured by CVC Specialty Chemicals Inc.).

Thereafter, the resin composition was formed into a core material layer (pre-adhesion core material layer) having a thick portion shown in FIG. 7. The core material layer included the thick portion positioned in the center in the second direction, and a thin portion positioned around it. The core material resin in the core material layer was in an uncured state.

3. Preparation of Adhesive Layer

Each of the following components was blended to be kneaded with the mixing roll, thereby preparing a kneaded product (thermosetting resin composition). In the kneading, first, the epoxy resin, the rubber-modified epoxy resin, the filler, and the toughness imparting agent were kneaded with the mixing roll that was heated at 120° C. and thereafter, the kneaded product was cooled to 60 to 100° C. Furthermore, the latent curing agent was added thereto to be kneaded with the mixing roll, thereby obtaining the kneaded product.

Bisphenol A epoxy resin (trade name: Epikote (registered trademark) #834, epoxy equivalent of 270 g/eq., manufactured by Mitsubishi Chemical Corporation) . . . 50 parts by mass Liquid CTBN-modified epoxy resin (trade name: EPR 1415-1, epoxy equivalent of 400 g/eq., manufactured by ADEKA CORPORATION) . . . 35 parts by mass Solid CTBN-modified epoxy resin (trade name: HypoxRK84L, epoxy equivalent of 1200 to 1800 g/eq., manufactured by CVC Specialty Chemicals Inc.) . . . 15 parts by mass Urea compound: 3-(3,4-dichlorophenyl)-1,1-dimethyl-urea (trade name: DCMU, manufactured by Hodogaya Chemical Co., Ltd.) . . . 2 parts by mass Dicyandiamide (trade name: DDA-50, manufactured by CVC Specialty Chemicals Inc.) . . . 5 parts by mass Hydrophobic silica: dimethyl silicone oil surface-treated silica (trade name: AEROJIL RY200, average particle size of 12 μm, manufactured by NIPPON AEROSIL CO., LTD.) . . . 2 parts by mass Glass powder: glass powder (trade name: PF70E-001, specific gravity of 2.58, average fiber length of 10.5 μm, manufactured by Nitto Boseki. Co., Ltd.) . . . 20 parts by mass Next, the obtained kneaded product in a state of being sandwiched between the release paper was rolled to have a thickness of 0.1 mm by the press molding, thereby forming the thermosetting resin layer.

Thereafter, the release paper on the one-side surface of the thermosetting resin layer was peeled, and the thermosetting resin layer was attached to both surfaces of the non-woven fabric (trade name: 8004, manufactured by NISSEI Co., Ltd.) having a thickness of 130 μm by heat press (50° C.) so as to have a total thickness of the thermosetting resin layer and the substrate of 0.2 mm, thereby preparing the double-coated adhesive tape.

4. Attaching of Front Layer and Adhesive Layer to Core Material Layer

Next, the front layer was disposed on the front surface of the core material layer to be pressed so that the front layer went toward the core material layer. In this manner, the front layer was attached to the core material layer.

The double-coated adhesive tape was disposed on the rear surface of the core material layer to be pressed so that the double-coated adhesive tape went toward the core material layer. In this manner, the double-coated adhesive tape was attached to the core material layer, thereby forming the adhesive layer.

In this way, the reinforcement sheet (pre-adhesion reinforcement sheet) including the core material layer, the front layer, and the adhesive layer was prepared.

5. Preparation of Metal Plate

A metal plate having a hat shape when viewed from the cross-sectional view shown in FIG. 2C was prepared. The metal plate had a thickness of 0.8 mm. The size (size in a depth direction of the recessed portion) in the first direction of the metal plate was 20 mm, the size (size including the flange portion and the recessed portion) in the second direction of the metal plate was 60 mm, and the size in the direction perpendicular to both directions of the first direction and the second direction of the metal plate was 150 mm. The size in the second direction of the recessed portion of the metal plate was 30 mm.

6. Attachment of Reinforcement Sheet to Metal Plate

First, as shown in FIG. 2B, the reinforcement sheet was heated at 60° C. (preliminarily heating temperature) to be preliminarily shaped by the mold having a shape corresponding to the recessed portion. The mold had a shape shown in FIG. 2B, and had the first mold surface, the second mold surface, the third mold surface, the fourth mold surface, and the fifth mold surface.

Next, as shown in FIG. 3A, the reinforcement sheet that was preliminarily shaped was heated at 175° C. (attachment temperature), and thereafter, the metal plate was pressed toward the mold so that that reinforcement sheet was fitted into the recessed portion.

Next, 175° C. (attachment temperature) was retained for 150 seconds, and heating was carried out at 175° C. for 35 minutes with a hot air dryer, so that the adhesive, the core material resin, and the front layer resin were cured.

In this manner, the reinforcement sheet adhered to the inner surface (the first surface, the second surface, the third surface, the first corner portion, and the second corner portion) of the recessed portion, thereby producing the reinforcement structure. Thereafter, the mold was removed from the reinforcement structure.

The reinforcement structure of Example 1 had the same structure as that of the first embodiment shown in FIG. 1.

Example 2

A reinforcement structure was produced in the same manner as that of Example 1, except that as shown in FIG.

2A, the core material layer (pre-adhesion core material layer) had a fixed thickness over the whole layer, and did not have the thick portion. The thickness of the core material layer was the same as that of the thin portion of the core material layer in Example 1.

Figure 6:
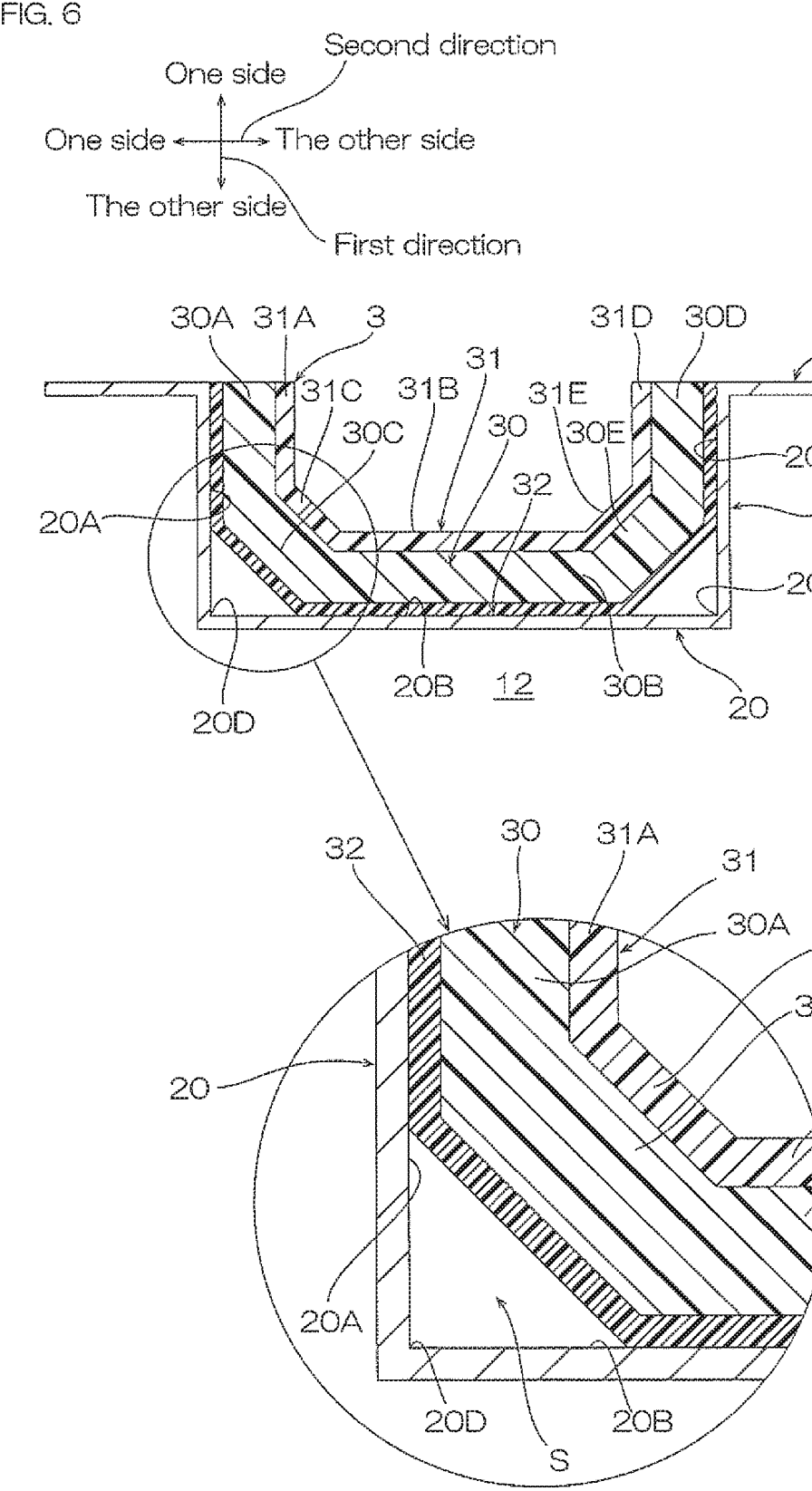
FIG. 6 shows a cross-sectional view of a fourth embodiment of a reinforcement structure of the present invention.

The reinforcement structure of Example 2 had the same structure as that of the fourth embodiment shown in FIG. 6.

Comparative Example 1

The reinforcement structure was produced in the same manner as that of Example 1, except that the mold did not have the third mold surface and the fifth mold surface, the first mold surface was directly connected to the second mold surface, and the second mold surface was directly connected to the fourth mold surface.

In the reinforcement structure of Comparative Example 1, the entire front layer was positioned at fixed intervals (with the same width) to the inner surface (the first surface, the second surface, and the third surface) of the recessed portion.

Comparative Example 2

The above-described unidirectional fiber resin composite sheets (12 pieces) were prepared, and laminated so that the fiber directions of the unidirectional fiber resin composite sheets that were next to each other were perpendicular to each other. Thereafter, the plurality of unidirectional fiber resin composite sheets were pressed so as to be sandwiched from the outside in the thickness direction, thereby preparing the front layer.

Next, the above-described double-coated adhesive tape was attached to the front layer, thereby preparing the reinforcement sheet including the front layer and the adhesive layer, and without including the core material layer.

Next, the reinforcement sheet adhered to the inner surface of the recessed portion in the same manner as that of Example 1, thereby producing the reinforcement structure.

Evaluation

Measurement of Maximum Bending Testing Force

The maximum bending testing force (the maximum value of a load in a bending test) of each of the reinforcement structures obtained in Examples and Comparative Examples was measured under the following test conditions with a bending testing machine (trade name: Technograph TG-100kN (load cell: TC3D-100kN), manufactured by Minebea Co., Ltd.).

Test conditions: three-point bending method, distance between supporting points=100 mm, test rate of 5 mm/min, room temperature (23° C.)

The results are shown in the following.

Example 1: 12.7 kN, Example 2: 11.9 kN,
Comparative Example 1: 9.9 kN, Comparative Example 2: 7.8 kN While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The reinforcement structure of the present invention can be applied for reinforcement of an adherend used for various industrial products, and can be, for example, preferably used for reinforcement of a metal plate used in transportation machines, a metal plate used in household electric appliances, or the like. The method for producing a reinforcement structure of the present invention can be applied for various industrial products, and can be, for example, preferably used for transportation machines, household electric appliances, or the like.

DESCRIPTION OF REFERENCE NUMERALS

1 Reinforcement structure
2 Metal plate
3 Reinforcement sheet
4 Mold
10 Reinforcement structure
11 Reinforcement structure
12 Reinforcement structure
20A First surface
20B Second surface
20C Third surface
20D First corner portion
20E Second corner portion
30 Core material layer
30A First portion
30B Second portion
30C Third portion
30D Fourth portion
30E Fifth portion
31 Front layer
31A First front layer portion
31B Second front layer portion
31C Third front layer portion
32 Adhesive layer
41A First mold surface
41B Second mold surface
41C Third mold surface

The invention claimed is:
1. A reinforcement structure comprising:
an adherend; and
a reinforcement sheet adhering to the adherend and reinforcing the adherend;
wherein the adherend includes:
a first surface extending in a first direction;
a second surface extending in a second direction crossing the first direction; and
a first corner portion connecting the first surface to the second surface;
wherein the reinforcement sheet includes:
a front layer containing a plurality of fibers and positioned at spaced intervals to the first surface, the second surface, and the first corner portion;
an adhesive layer being in direct contact with the first surface, the second surface, and the first corner portion; and
a core material layer obtained by curing a core material layer that is in an uncured state, and contains an unmodified epoxy resin and a rubber-modified epoxy resin as a resin, and further contains a latent curing agent that cures the resin at 80° C. or more and 200° C. or less, the cured core material layer being disposed between the front layer and the adhesive layer;

wherein the adhesive layer is provided along the first surface, the second surface, and the first corner portion, wherein the front layer includes:
 a first front layer portion positioned at spaced intervals to the first surface in the second direction and extending in the first direction;
 a second front layer portion positioned at spaced intervals to the second surface in the first direction and extending in the second direction; and
 a third front layer portion positioned at spaced intervals to the first corner portion in a third direction crossing both directions of the first direction and the second direction and connecting the first front layer portion to the second front layer portion;
 wherein a gap between the first surface and the third front layer portion in the second direction gradually increases as it gets closer to the first corner portion in the first direction with respect to a gap between the first surface and the first front layer portion in the second direction; and
 wherein a gap between the second surface and the third front layer portion in the first direction gradually increases as it gets closer to the first corner portion in the second direction with respect to a gap between the second surface and the second front layer portion in the first direction;
wherein the cured core material layer includes:
 a first portion along the first surface;
 a second portion along the second surface; and
 a third portion along the first corner portion; and
 wherein a thickness of the third portion along the second direction is thicker than a thickness of the first portion along the second direction and a thickness of the third portion along the first direction is thicker than a thickness of the second portion along the first direction.

2. The reinforcement structure according to claim 1, wherein the first portion, the second portion, and the third portion are integrated.

3. The reinforcement structure according to claim 1, wherein the adherend further includes:
 a third surface facing the first surface at spaced intervals thereto in the second direction; and
 a second corner portion connecting the third surface to the second surface;
wherein the cured core material layer further includes:
 a fourth portion along the third surface; and
 a fifth portion along the second corner portion; and
 a thickness of the fifth portion along the second direction is thicker than a thickness of the fourth portion along the second direction and a thickness of the fifth portion along the first direction is thicker than a thickness of the second portion along the first direction.

4. The reinforcement structure according to claim 1, wherein the adhesive layer includes a substrate having two surfaces, and an adhesive that is laminated on both surfaces of the substrate.

5. The reinforcement structure according to claim 1, wherein the core material in an uncured state includes a filler, and a content ratio of the filler in the core material layer in an uncured state is 15% mass or more.

6. The reinforcement structure according to claim 1, wherein the core material in an uncured state includes a filler, and a content ratio of the filler in the core material layer in an uncured state is 85 mass % or less.

7. The reinforcement structure according to claim 1, wherein the core material in an uncured state includes a filler, and the filler is calcium carbonate.

8. A method for producing a reinforcement structure comprising the steps of:
 preparing a reinforcement sheet including a core material layer being in an uncured state and containing an unmodified epoxy resin and a rubber-modified epoxy resin as a resin and further containing a latent curing agent that cures the resin at 80° C. or more and 200° C. or less, a front layer disposed at one side in a thickness direction of the core material layer in an uncured state and containing a plurality of fibers, and an adhesive layer disposed at one side in the thickness direction of the core material layer in an uncured state;
 preparing an adherend including a first surface extending in a first direction, a second surface extending in a second direction crossing the first direction, and a first corner portion connecting the first surface to the second surface; and
 attaching the reinforcement sheet to the adherend so as to provide the adhesive layer along the first surface, the second surface, and the first corner portion, position the core material layer in an uncured state between the adhesive layer and the front layer, and position the front layer at spaced intervals to the first surface, the second surface, and the first corner portion;
wherein the step of attaching the reinforcement sheet to the adherend, further comprises:
 positioning a first front layer portion in the front layer at spaced intervals to the first surface in the second direction and extending in the first direction;
 positioning a second front layer portion in the front layer at spaced intervals to the second surface in the first direction and extending in the second direction;
 positioning a third front layer portion in the front layer at spaced intervals to the first corner portion in a third direction crossing both directions of the first direction and the second direction; and
 positioning the third front layer portion so that a gap between the first surface and the third front layer portion in the second direction gradually increases as it gets closer to the first corner portion in the first direction with respect to a gap between the first surface and the first front layer portion in the second direction; and
 wherein a gap between the second surface and the third front layer portion in the first direction gradually increases as it gets closer to the first corner portion in the second direction with respect to a gap between the second surface and the second front layer portion in the first direction;
wherein the core material layer in an uncured state includes:
 a first portion along the first surface;
 a second portion along the second surface; and
 a third portion along the first corner portion; and
 wherein a thickness of the third portion along the second direction is thicker than a thickness of the first portion along the second direction and a thickness of the third portion along the first direction is thicker than a thickness of the second portion along the first direction.

9. The method for producing a reinforcement structure according to claim 8, wherein the step of attaching the reinforcement sheet to the adherend, further comprises:

flowing the core material layer in an uncured state so that in the core material layer in an uncured state, a thickness along the second direction of the third portion along the first corner portion is thicker than a thickness along the second direction of the first portion along the first surface, and a thickness of the third portion along the first direction is thicker than a thickness along the first direction of the second portion along the second surface.

10. The method for producing a reinforcement structure according to claim 8, wherein the step of attaching the reinforcement sheet to the adherend, further comprises:

pressing the reinforcement sheet along a mold having a shape corresponding to the adherend and heating the reinforcement sheet at a first temperature to preliminarily shape the reinforcement sheet, and next, while heating the preliminarily shaped reinforcement sheet at a second temperature higher than or equal to the first temperature, pressing the preliminarily shaped reinforcement sheet toward the adherend by the mold; and wherein providing the mold further comprises:

extending a first mold surface in the first direction corresponding to the first surface;

extending a second mold surface in the second direction corresponding to the second surface; and providing a third mold surface connecting the first mold surface to the second mold surface and extending in a direction crossing the third direction.

\* \* \* \* \*